US 6,728,271 B1

(12) United States Patent
Kawamura et al.

(10) Patent No.: US 6,728,271 B1
(45) Date of Patent: Apr. 27, 2004

(54) STREAM DEMULTIPLEXING DEVICE

(75) Inventors: Osamu Kawamura, Kadoma (JP); Toshiyuki Kajimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 827 days.

(21) Appl. No.: 09/649,072

(22) Filed: Aug. 22, 2000

(30) Foreign Application Priority Data

Aug. 24, 1999 (JP) .......................................... H11-237563

(51) Int. Cl.[7] .................................................. H04J 3/04
(52) U.S. Cl. ...................... 370/536; 370/311; 370/536; 370/542; 380/212; 725/151
(58) Field of Search ................................ 370/536, 389, 370/311, 337, 428, 429, 503, 516, 535, 538, 540, 542, 543, 544; 455/343.1; 725/151, 139, 131, 68, 100, 89; 380/212; 348/726

(56) References Cited

U.S. PATENT DOCUMENTS

| 4,980,885 A | | 12/1990 | Servel et al. |
| 5,640,398 A | * | 6/1997 | Carr et al. ................... 370/376 |
| 5,666,355 A | * | 9/1997 | Huah et al. .................. 370/311 |
| 5,757,416 A | * | 5/1998 | Birch et al. ................. 725/144 |
| 5,923,755 A | * | 7/1999 | Birch ......................... 380/212 |
| 6,078,783 A | * | 6/2000 | Kawamura et al. ......... 725/120 |
| 6,236,432 B1 | * | 5/2001 | Lee ........................ 375/240.26 |
| 6,275,507 B1 | * | 8/2001 | Anderson et al. ........... 370/487 |

FOREIGN PATENT DOCUMENTS

JP          213155          7/1998

* cited by examiner

Primary Examiner—Ajit Patel
Assistant Examiner—Steven Blount

(57) ABSTRACT

In a stream demultiplexing device, a synchronous clock signal is supplied to a header processing unit only when a header is being inputted and processed in the header processing unit, and supplied to a payload processing unit only when a payload is being inputted and processed in the payload processing unit. By such cutting off the synchronous clock signal supply to the header processing unit and the payload processing unit while they are not active, power consumption in the stream demultiplexing device is reduced.

22 Claims, 21 Drawing Sheets

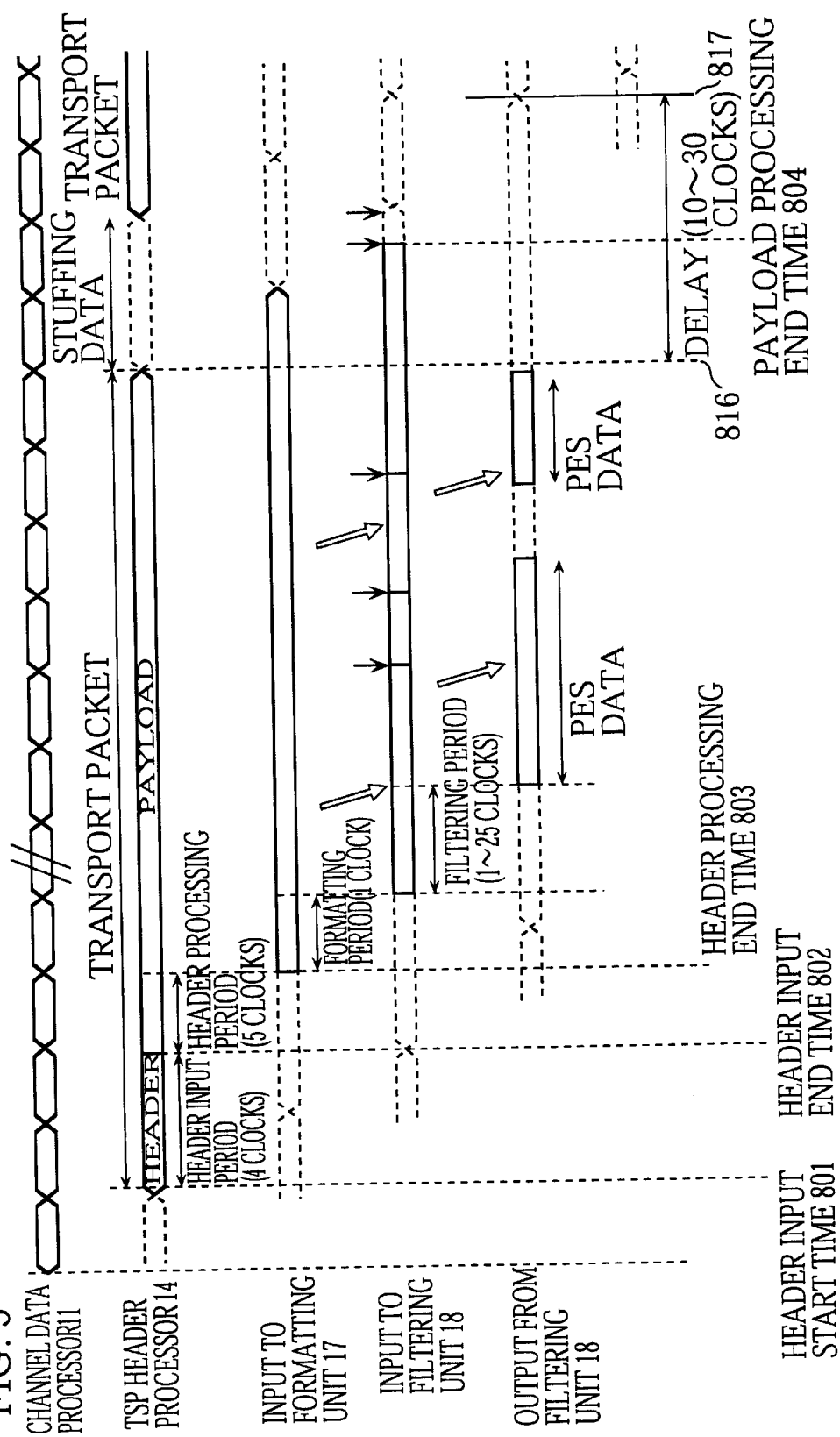

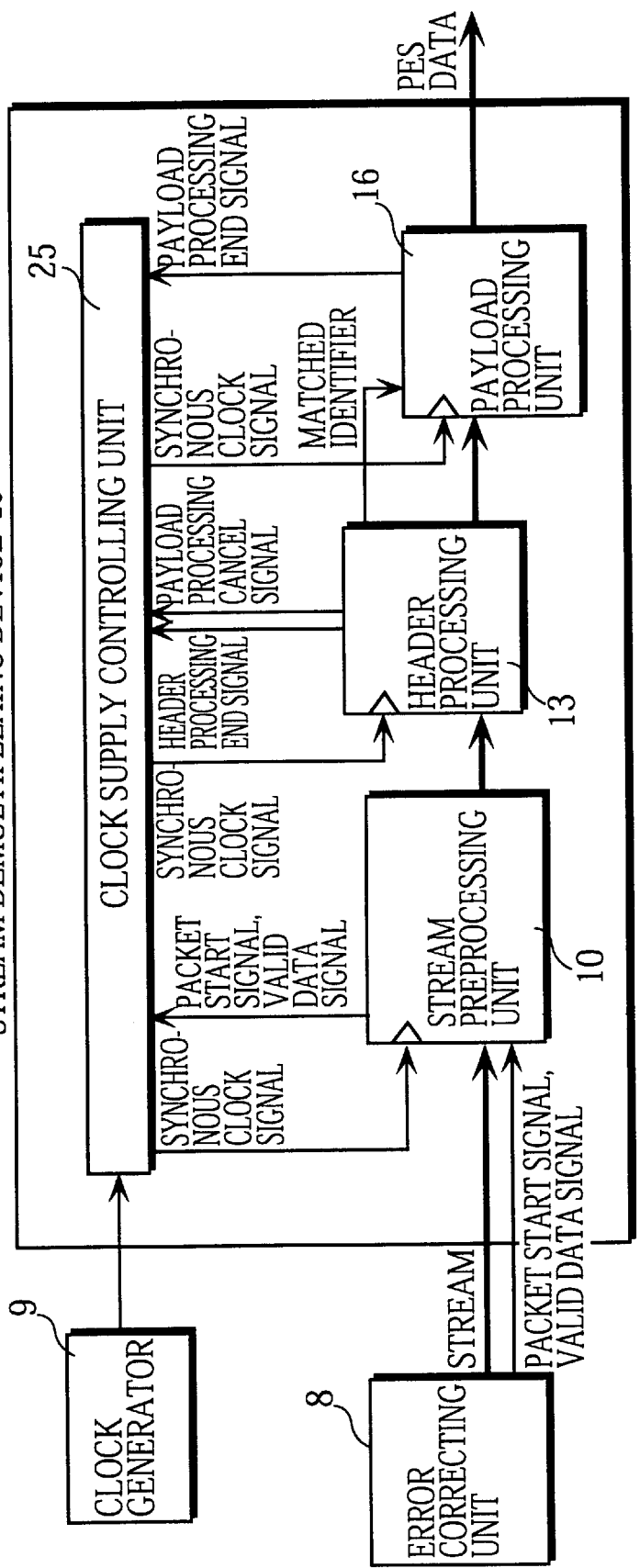

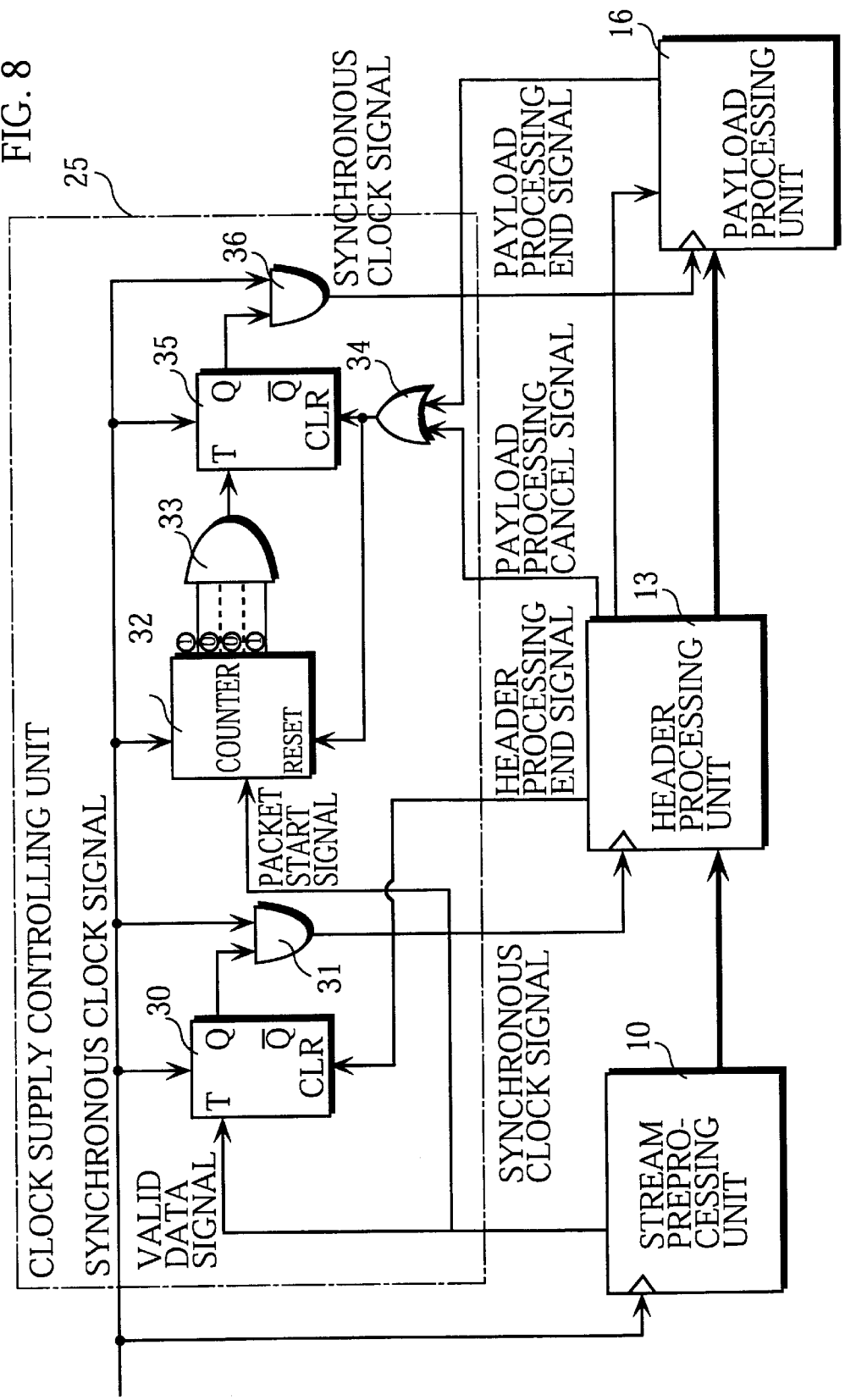

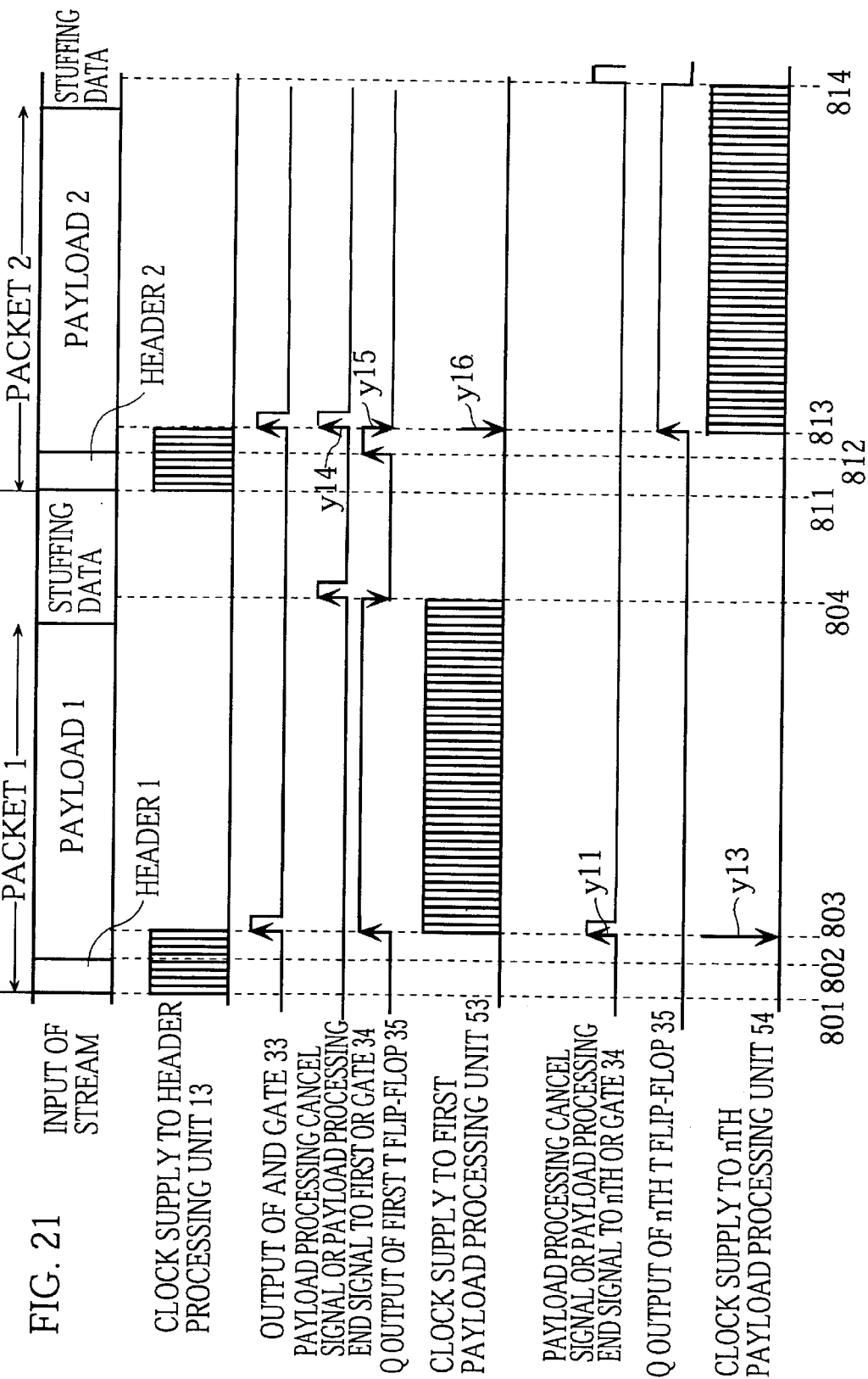

STREAM DEMULTIPLEXING DEVICE

This application is based on an application No. H11-237563 filed in Japan, the content of which is hereby incorporated by reference.

BACKGROUND OF THE INVENTION

1. Field of the Invention

The present invention relates to a stream demultiplexing device for demultiplexing a transport stream superimposed on a broadcast wave into a plurality of elementary streams.

2. Description of the Prior Art

In the semiconductor market, a one-chip LSI for use in a set-top box is expected to grow in demand in the years ahead.

A set-top box is a device that receives a broadcast wave via satellite, ground wave, or cable, demultiplexes a transport stream superimposed on the broadcast wave into elementary streams, and decodes the elementary streams to produce output such as video and audio signals. Set-top boxes, when used with television sets or personal computers in ordinary households, allow users to enjoy a variety of information services provided via satellite, ground wave, and cable. For this reason, set-top boxes are likely to become necessities in the coming multimedia age.

A one-chip LSI for use in a set-top box (one-chip STB-LSI) is an integrated circuit that is made up of a transport decoder (e.g. Matsushita MN88461A) for demultiplexing a transport stream transmitted on a broadcast wave into MPEG elementary streams such as video and audio streams, an AV decoder (e.g. Matsushita MN67750 and MN67751) for decoding the demultiplexed video and audio streams, and a microprocessor (e.g. Matsushita MN103002A) for controlling input/output in the set-top box. Such a one-chip STB-LSI, when equipped in a set-top box, realizes all basic operations required of the set-top box, with it being possible to simplify the wiring in the set-top box and bring down the cost of manufacturing of the set-top box.

In this one-chip STB-LSI, the demultiplexing of the transport stream is the upstream operation. Hence the transport decoder is required to perform the demultiplexing at high speed. Since the transport stream carries an enormous number of transport packets in which a plurality of elementary streams are time-division multiplexed, transfer and latch of transport packets are frequently performed inside the transport decoder.

Such frequent transfer and latch of transport packets are done by vast numbers of flip-flops mounted on the one-chip STB-LSI. In each flip-flop, as long as a clock input is provided with a synchronous clock signal for synchronous control, a logic element repeats charge/discharge in accordance with the synchronous clock signal. Given that a one-chip LSI is generally constructed of an MOS (Metal Oxide Semiconductor) LSI, the above repetition of charge/discharge with the synchronous clock signal in the logic element of each flip-flop causes massive power consumption in the one-chip STB-LSI.

SUMMARY OF THE INVENTION

The present invention aims to provide a stream demultiplexing device for demultiplexing a transport stream at high speed with reduced power consumption.

The above object can be achieved by a stream demultiplexing device for demultiplexing a plurality of elementary streams from a transport stream in which the plurality of elementary streams are time-division multiplexed, the transport stream including a plurality of transport packets that each contain a payload carrying a data portion taken from one of the plurality of elementary streams, the stream demultiplexing device including: a storing unit having a plurality of storage areas each for storing a different one of the plurality of elementary streams; a signal generating unit for generating a synchronous clock signal; a payload processing unit for obtaining, after the stream demultiplexing device starts receiving a present transport packet, a payload of the present transport packet and transferring a data portion in the obtained payload to a storage area in the storing unit that corresponds to an elementary stream from which the data portion was taken, in accordance with the synchronous clock signal supplied from the signal generating unit; and a first clock supply controlling unit for stopping the supply of the synchronous clock signal to the payload processing unit when the payload processing unit finishes transferring the data portion, and resuming the supply a predetermined time period after the stream demultiplexing device starts receiving a transport packet that follows the present transport packet.

Suppose time required for inputting and processing a payload is denoted by p, and time required for inputting a transport packet is denoted by L. Then a time period of supplying the synchronous clock signal to the payload processing unit for one transport packet is reduced to p/L according to the above construction. With such a curtailment of synchronous clock signal supply to the payload processing unit, power consumption of the payload processing unit is reduced even if it is equipped with an enormous number of flip-flops. As a result, power consumption in the stream demultiplexing device is reduced, with it being possible to realize a lower-power one-chip STB-LSI.

Here, the plurality of elementary streams may include a video stream generated by encoding a video signal and an audio stream generated by encoding an audio signal, wherein after the video stream and the audio stream have been reconstructed in the storing unit from the data portions transferred by the payload processing unit, the video stream and the audio stream are decoded using a dedicated decoder outside the stream demultiplexing device.

Even when the stream demultiplexing device is equipped with the payload processing unit of high functionality and large circuitry to efficiently demultiplex the transport stream into the plurality of elementary streams such as video and audio streams, power consumption of the payload processing unit is reduced due to the above curtailment of synchronous clock signal supply to the payload processing unit. Therefore, power consumption in the stream demultiplexing device is reduced.

Here, the stream demultiplexing device may further include the header processing unit that includes: a reading unit for reading an identifier from the header of the present transport packet; a holding unit for holding a predetermined tuning identifier in advance; and a judging unit for judging whether the identifier read by the reading unit matches the tuning identifier held in the holding unit, and notifying the read identifier to the payload processing unit if the read identifier matches the tuning identifier, wherein the first clock supply controlling unit includes a stopping unit for stopping the supply of the synchronous clock signal to the payload processing unit when the judging unit in the header processing unit judges that the read identifier does not match the tuning identifier, and wherein the first clock supply controlling unit resumes the supply which was stopped by the stopping unit, the predetermined time period after the stream demultiplexing device starts receiving the following transport packet.

When video and audio streams that provide numerous different broadcast programs are multiplexed in the transport stream, the synchronous clock signal is not supplied to the payload processing unit if an inputted transport packet does not meet a predetermined tuning pattern. In so doing, power consumption in the stream demultiplexing device is further reduced.

Here, at least one of the plurality of elementary streams may have been encrypted before being multiplexed in the transport stream, wherein the header processing unit includes: a reading unit for reading an identifier from the header of the present transport packet; a holding unit for prestoring an identifier identifying the encrypted elementary stream; and a judging unit for judging whether the identifier read by the reading unit matches the identifier in the holding unit, the stream demultiplexing device further including: a decrypting unit for obtaining, if the judging unit in the header processing unit judges that the read identifier matches the identifier in the holding unit, the payload of the present transport packet and decrypting the data portion in the obtained payload, in accordance with the synchronous clock signal supplied from the signal generating unit; and a third clock supply controlling unit for stopping the supply of the synchronous clock signal to the decrypting unit when the decrypting unit finishes decrypting the data portion, and resuming the supply when the judging unit judges that an identifier in a header of the following transport packet matches the identifier in the holding unit, wherein if the judging unit judges that the read identifier matches the identifier in the holding unit, the payload processing unit obtains the decrypted data portion generated by the decrypting unit and transfers the decrypted data portion to the storing unit, in accordance with the synchronous clock signal.

When one of the plurality of elementary streams multiplexed in the transport stream has been encrypted, the synchronous clock signal is supplied to the decrypting unit if the inputted transport packet contains a data portion which needs to be decrypted. Otherwise, the synchronous clock signal is not supplied to the decrypting unit. By such a curtailment of synchronous clock signal supply to the decrypting unit, power consumption of the decrypting unit is reduced even if the decrypting unit has large circuitry, so that power consumption in the stream demultiplexing device is reduced.

Here, the payload of each transport packet in the transport stream may further carry an identifier identifying the elementary stream from which the data portion in the payload was taken, wherein the payload processing unit includes: a formatting unit for extracting the data portion from the payload of the present transport packet, after the stream demultiplexing device starts receiving the present transport packet; and a filtering unit holding a plurality of identifiers in advance, for transferring the extracted data portion to the storing unit if an identifier in the payload of the present transport packet matches any of the plurality of identifiers, and rejecting the data portion if the identifier in the payload does not match any of the plurality of identifiers, wherein the first clock supply controlling unit includes a stopping unit for stopping the supply of the synchronous clock signal to the payload processing unit when the filtering unit rejects the data portion, and wherein the first clock supply controlling unit resumes the supply which was stopped by the stopping unit, the predetermined time period after the stream demultiplexing device starts receiving the following transport packet.

When implementing the broadcast program search service in the payload processing unit that has become a popular feature of a set-top box in recent years, the synchronous clock signal supply to the payload processing unit is discontinued if the inputted transport packet does not meet any search pattern. This further reduces power consumption in the stream demultiplexing device.

Here, the payload processing unit may include a plurality of processing subunits each for processing a payload in accordance with the synchronous clock signal supplied from the signal generating unit, wherein the header processing unit includes a selecting unit for selecting one of the plurality of processing subunits which is to process the payload of the present transport packet, based on an identifier in the header of the present transport packet, and wherein the first clock supply controlling unit stops the supply of the synchronous clock signal to the other processing subunits when the selecting unit selects the processing subunit, and resumes the supply when the selected processing subunit finishes transferring the data portion and the stream demultiplexing device starts receiving the following transport packet.

When the stream demultiplexing device is equipped with a plurality of payload processing subunits for separately processing the plurality of elementary streams, the synchronous clock signal is supplied only to a payload processing subunit that is to process the inputted transport packet, and is not supplied to the other payload processing subunits. By such prohibiting the synchronous clock signal supply to the payload processing subunits which are being idle, power consumption of the plurality of payload processing subunits is reduced, with it being possible to reduce power consumption in the stream demultiplexing device.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 5 is a timing chart showing input/output of a transport packet in the stream demultiplexing device 26;

FIG. 7 shows the construction of the stream demultiplexing device 26 where, of the construction elements in FIG. 3, those which constitute main features of the invention are selectively shown;

FIG. 8 shows the construction of a clock supply controlling unit 25 in FIG. 7;

FIG. 21 is a timing chart showing how the synchronous clock signal is supplied to n payload processing units 53 to 54 in FIG. 20.

DESCRIPTION OF THE PREFERRED EMBODIMENT(S)

First Embodiment

Figure 1:
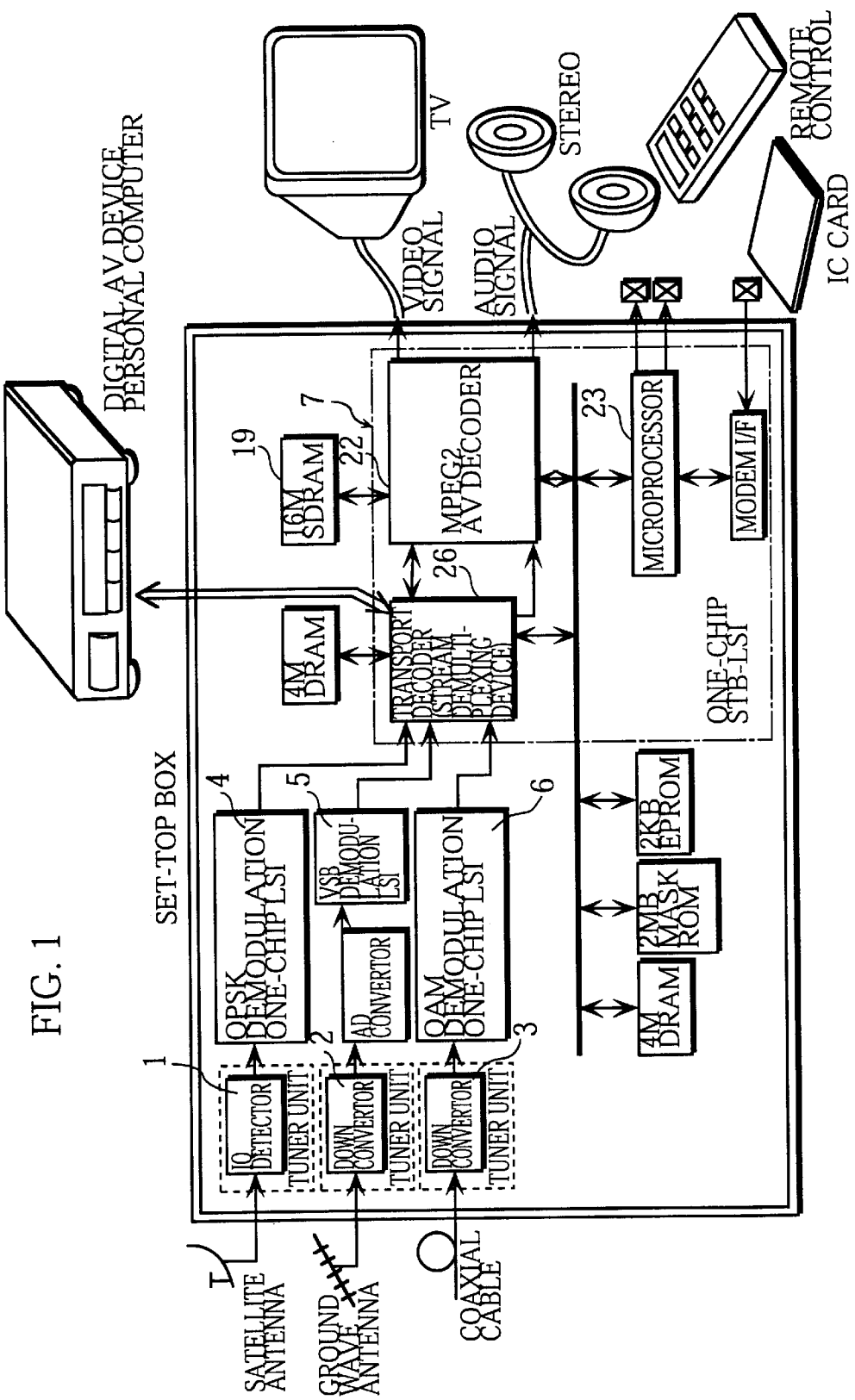
FIG. 1 shows the construction of a set-top box.

FIG. 1 shows the inner construction of a set-top box. This set-top box includes a tuner unit 1 for performing IQ detection on a broadcast wave received by a satellite antenna, a tuner unit 2 for performing down conversion on a broadcast wave received by a ground wave antenna, a tuner unit 3 for performing down conversion on a broadcast wave transmitted over a coaxial cable, a QPSK (Quadrature Phase Shift Keying) demodulation one-chip LSI 4 for performing QPSK demodulation on the broadcast wave which has undergone the IQ detection by. the tuner unit 1, a VSB (Vestigial Side Band) demodulation LSI 5 for performing VSB demodulation on the broadcast wave which has undergone the down conversion by the tuner unit 2, a QAM (Quadrature Amplitude Modulation) demodulation one-chip LSI 6 for performing QAM demodulation on the broadcast wave which has undergone the down conversion by the tuner unit 3, and a one-chip STB-LSI 7. The one-chip STB-LSI. 7 is equipped with a transport decoder (stream demultiplexing device) 26, an MPEG2 AV decoder 22, and a microprocessor 23.

Of these construction elements, the transport decoder (stream demultiplexing device) 26 for demultiplexing a transport stream is the key construction element in this invention. The transport stream here is a stream in which a plurality of MPEG elementary streams such as video, audio, and private streams are time-division multiplexed for transmission.

Figure 2A:
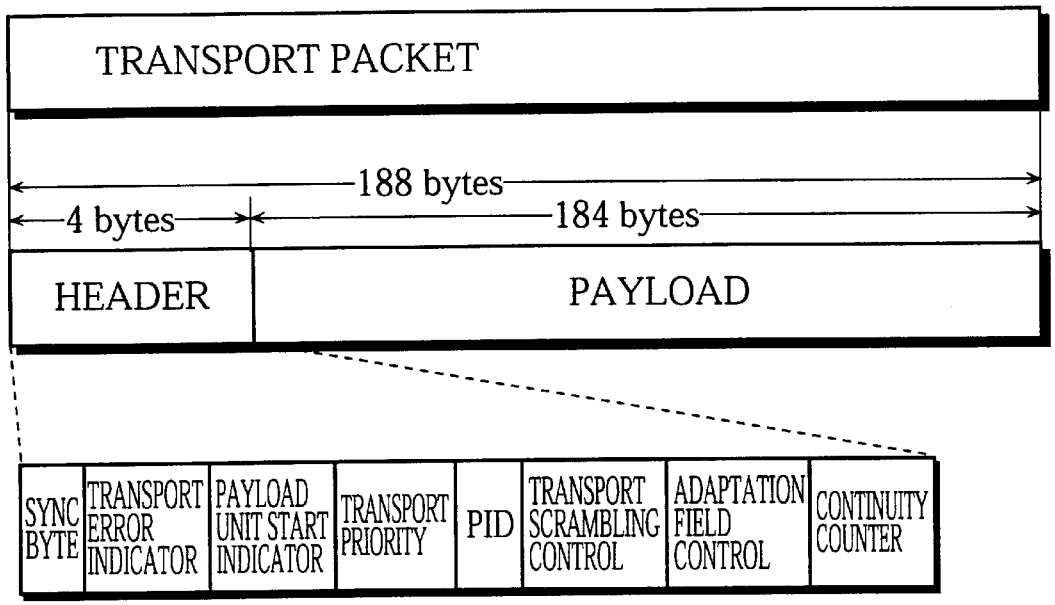
FIG. 2A shows the data format of a transport packet.

More specifically, the transport stream is stream-type data that contains a large number of transport stream packets (TSPs, hereinafter simply called "transport packet"). FIG. 2A shows the data format of a transport packet. As shown in the figure, the transport packet is 188 bytes long having a 4-byte header and an 184-byte payload. The header is information for identifying the attribute of the original elementary stream from which a PES (Packetized Elementary Stream) data portion contained in the payload is taken. The header includes the sync byte, the transport error indicator, the payload unit start indicator, the transport priority, the packet identifier (PID), the transport scrambling control information, the adaptation field control information, and the continuity counter.

Figure 2B:
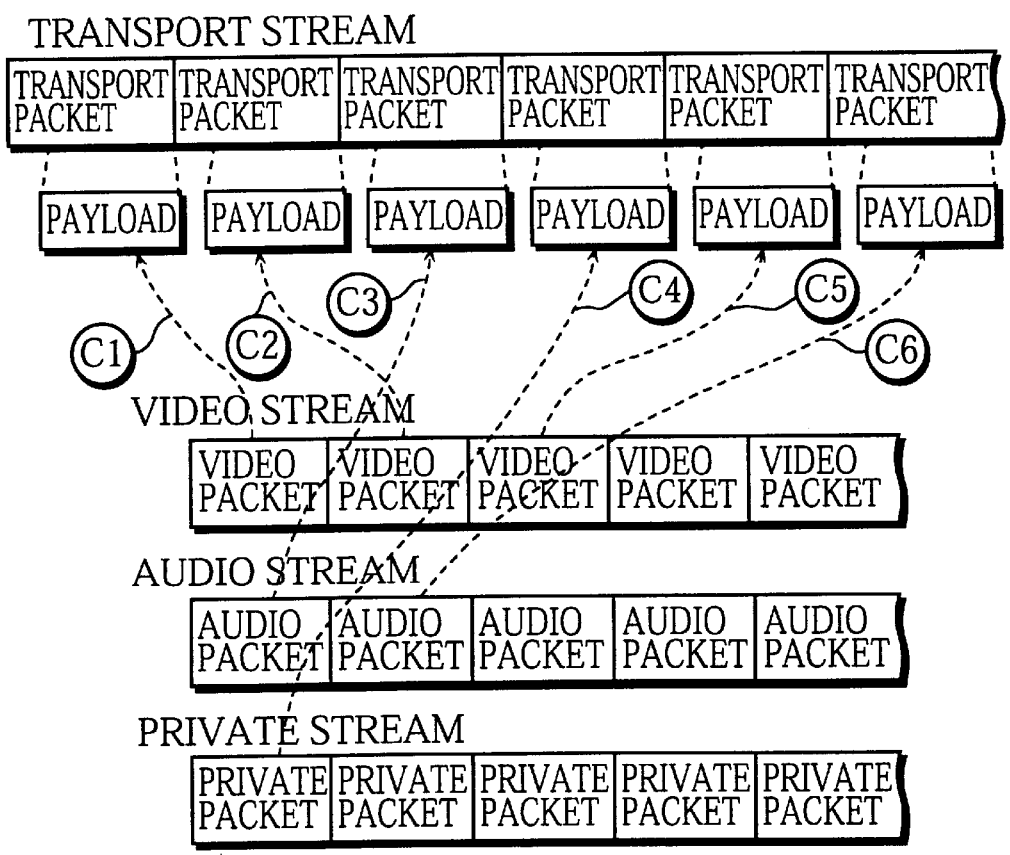
FIG. 2B shows how MPEG elementary streams such as video, audio, and private streams are stored in payloads of transport packets in a transport stream.

A plurality of elementary streams are time-division multiplexed and stored into payloads of transport packets in a transport stream as PES data portions. FIG. 2B shows how MPEG elementary streams such as video, audio, and private streams are stored into payloads of transport packets. In the figure, the first row shows transport packets in a transport stream, the second row shows payloads of the transport packets, and the third to fifth rows respectively show a video stream, an audio stream, and a private stream. As illustrated, the video, audio, and private streams are respectively made up of a plurality of video packets, a plurality of audio packets, and a plurality of private packets (these video, audio, and private packets are called PES packets). The PES packets of the elementary streams are divided into data portions of 184 bytes and the 184-byte PES data portions are stored in the payloads of the transport packets, as designated by the arrows C1 to C6.

Extracting PES data portions from payloads of transport packets in a transport stream and combining the extracted PES data portions into original elementary streams such as video, audio, and private streams is called "demultiplexing (transport decoding)".

In general, a video stream is a stream generated by compressing a video signal in compliance with MPEG, and an audio stream is a stream generated by compressing an audio signal such that the audio signal can be reproduced in sync with the video signal.

A private stream is a stream used for transmitting data or a program, such as an electronic program guide, that is not MPEG-defined. Examples of the private stream are a program clock reference (PCR) stream for synchronizing the video stream and the audio stream, a program association table (PAT) stream, a program map table (PMT) stream, a network information table (NIT) stream specifying the network that provides the transport stream carrying it, a service description table (SDT) stream specifying the service the transport stream belongs to, and an event information table (EIT) stream specifying the events provided by the video and audio streams in the transport stream.

In FIG. 2B, it may appear that the PES packets themselves are stored in the payloads of the transport packets due to the schematic nature of the figure. However, the size of a PES packet is about 2K bytes whereas the size of a payload is 184 bytes, so that in reality each of the PES packets in the elementary streams are further divided into smaller data portions (184 bytes) so as to be stored in the payloads in the transport packets. Here, the order of dividing and storing the PES packets is determined based on time stamps attached to them, although this does not relate to the subject matter of the invention and so its explanation has been omitted here. The important point to note is that, regardless of how many different elementary streams are time-division multiplexed in one transport stream, all PES packets of the elementary streams are equally divided and stored in payloads of transport packets in the transport stream before transmission.

For details of the aforementioned tables, see publications such as ETS 300 468 (DVB-SI) and ISO/IEC 13818-1 (MPEG2 System).

Figure 3:
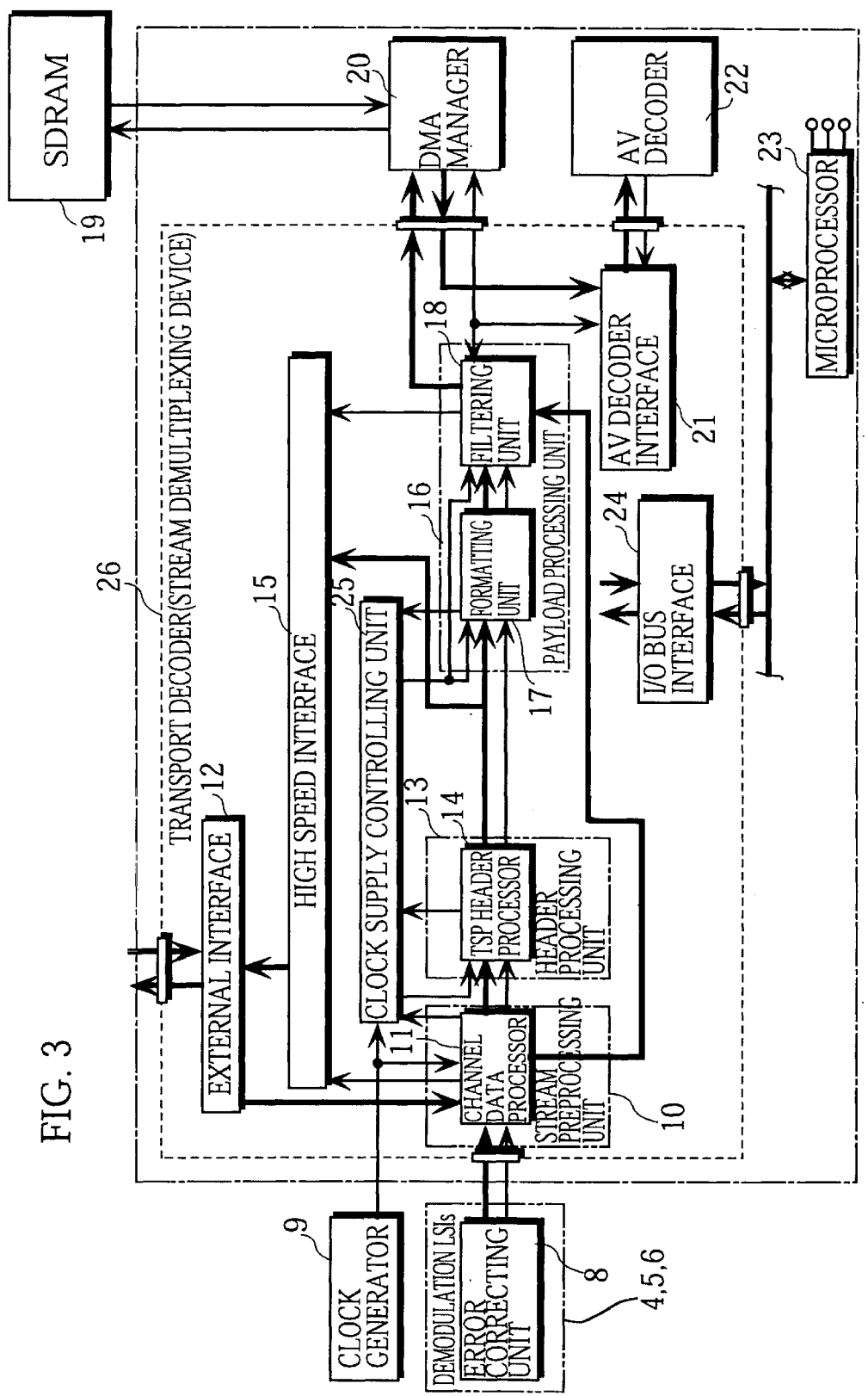
FIG. 3 shows the construction of a stream demultiplexing device (transport decoder) 26 shown in FIG. 1, together with the connections of the construction elements of the stream demultiplexing device 26 with demodulation LSIs 4 to 6, an SDRAM (Synchronous DRAM) 19, and an AV decoder 22.

The construction of the stream demultiplexing device (transport decoder) 26 is described below. FIG. 3 shows the construction elements of the stream demultiplexing device 26, along with the connections of these construction elements with the demodulation LSIs 4 to 6, the SDRAM 19, and the AV decoder 22.

This stream demultiplexing device 26 includes a stream preprocessing unit 10 (channel data processor 11), an external interface 12, a header processing unit 13 (TSP header processor 14), a high speed interface 15, a payload processing unit 16 (formatting unit 17 and filtering unit 18), an AV decoder interface 21, an I/O bus interface 24, and a clock supply controlling unit 25. As illustrated, the stream preprocessing unit 10 is connected with an error correcting unit 8 in the demodulation LSIs 4 to 6, the clock supply controlling unit 25 is connected with a clock generator 9, the filtering unit 18 is connected with the SDRAM 19 via a DMA (Direct Memory Access) manager 20, and the I/O bus interface 24 is connected with the microprocessor 23.

In the figure, a transport packet is transferred from the stream preprocessing unit 10 (channel data processor 11), the header processing unit 13 (TSP header processor 14), the payload processing unit 16 (formatting unit 17 and filtering unit 18), the DMA manager 20, to the SDRAM 19 in this order. This being so, input/output of the transport packet in the channel data processor 11, the TSP header processor 14, the formatting unit 17, and the filtering unit 18 are made by synchronous transfer in accordance with a synchronous clock signal generated by the clock generator 9. That is to say, the transmitter outputs the transport packet one byte at a time in sync with the synchronous clock signal, and the receiver latches the transport packet one byte at a time in sync with the synchronous clock signal. Since the channel data processor 11, the TSP header processor 14, the formatting unit 17, and the filtering unit 18 can be both the transmitter and the receiver, they are each equipped with a flip-flop for latching a transport packet, a header, or a payload.

FIG. 5 is a timing chart showing input/output of a transport packet (a header and a payload) in the channel data processor 11, the TSP header processor 14, the formatting unit 17, and the filtering unit 18 in synchronous transfer. As shown in the figure, there is an interval of 4+5 clocks between the time at which the TSP header processor 14 starts the input of the header (header input start time 801) and the time at which the formatting unit 17 starts the input of the payload (header processing end time 803). Also, there is an interval of 1 clock between the time at which the formatting unit 17 starts the input of the payload (header processing end time 803) and the time at which the filtering unit 18 starts the input of the payload. Further, there is an interval of 1 to 25 clocks between the time at which the filtering unit 18 starts the input of the payload and the time at which the filtering unit 18 starts the output of a PES data portion as the filtering result. These intervals are each determined by the operating time of the preceding stage(s). The significance of these intervals will be explained later with the operations of the channel data processor 11, TSP header processor 14, formatting unit 17, and filtering unit 18.

In FIG. 3, the error correcting unit 8 in the demodulation LSIs 4 to 6 extracts uncorrected transport packets and their parity codes from a received broadcast wave, generates an error correcting block from the extracted packets and codes, and performs error correction on the error correcting block. The error correcting unit 8 then outputs the corrected transport packets and stuffing data to the stream preprocessing unit 10, as the error correction results. An uncorrected transport packet mentioned here is a transport packet whose bits may have been changed during transmission on the broadcast wave. A parity code called a Reed-Solomon code is attached to this transport packet. By performing the error correction on the error correcting block using the Reed-Solomon parity codes, the error correcting unit 8 can correct, with a high probability of success, errors in the uncorrected transport packets in the transport stream.

Figure 4:
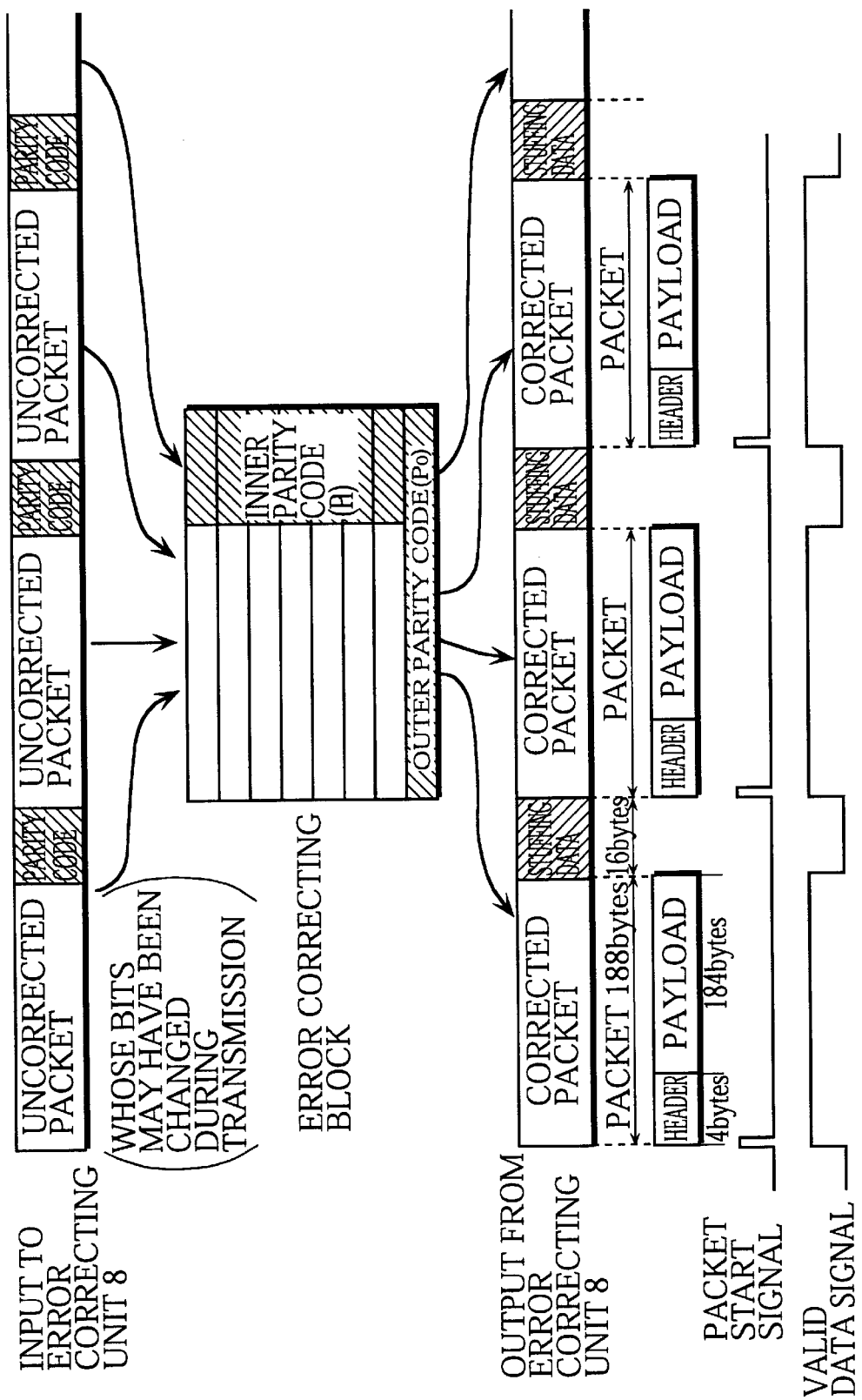
FIG. 4 shows input/output of an error correcting unit 8 in FIG. 3.

FIG. 4 shows input/output of the error correcting unit 8. In the figure, the first row shows uncorrected transport packets with their parity codes which are transmitted on a broadcast wave and inputted in the error correcting unit 8. The second row shows an error correcting block generated in the error correcting unit 8 as a result of accumulating the uncorrected transport packets with their parity codes. The third row shows corrected transport packets and stuffing data which are outputted from the error correcting unit 8 after error correction is performed on the error correcting block. As can be seen from the figure, while a parity code is inserted between each two adjacent uncorrected transport packets in the first row, stuffing data is inserted between each two adjacent corrected transport packets in the third row. The fourth row shows the structure of the corrected transport packets. The error correcting unit 8 outputs, as the error correction results, each combination of a corrected transport packet and stuffing data to the stream preprocessing unit 10 in the stream demultiplexing device 26. Here, the error correcting unit 8 also outputs a packet start signal and a valid data signal to the stream preprocessing unit 10. The packet start signal is used to indicate a start time of the input of each transport packet in the transport stream. The valid data signal is used to indicate a period taken for the input of each transport packet. The valid data signal is high while a transport packet is being inputted, and low while stuffing data is being inputted.

The clock generator 9 generates a synchronous clock signal for synchronizing the construction elements in the stream demultiplexing device 26 in transport packet processing.

The stream preprocessing unit 10 is also called the channel data processor 11. For transport stream data which is being inputted while the valid data signal is high, the stream preprocessing unit 10 latches each byte of the data into a buffer in sync with the synchronous clock signal generated by the clock generator 9, as a transport packet. For transport stream data which is being inputted while the valid data signal is low, the stream preprocessing unit 10 discards the data as stuffing data, without storing it into the buffer. The stream preprocessing unit 10 then outputs each byte of the transport packet stored in the buffer to the header processing unit 13 in sync with the synchronous clock signal. At the same time, the stream preprocessing unit 10 outputs the packet start signal and the valid data signal to the clock supply controlling unit 25.

The external interface 12 outputs a transport packet and stuffing data outputted from the header processing unit 13 via the high speed interface 15, to a digital AV device or a personal computer connected outside of the set-top box. The external interface 12 also outputs a transport packet and stuffing data outputted from the digital AV device or the personal computer outside of the set-top box, to the stream preprocessing unit 10.

The header processing unit 13 is also called the TSP header processor 14, and holds various identifiers beforehand. If a PID in a header of a transport packet outputted from the stream preprocessing unit 10 matches any of the held identifiers, the header processing unit 13 notifies the payload processing unit 16 of the matched PID. If the PID in the header indicates that payload processing is unnecessary, the header processing unit 13 notifies the clock supply controlling unit 25 that the payload processing is not necessary, by driving a payload processing cancel signal high. As shown in FIG. 5, it takes 4 clocks (header input period) to input the header into the header processing unit 13 (TSP header processor 14). Then it takes 5 clocks (header processing period) to process the header in the header processing unit 13. After this, the header processing unit 13 notifies the clock supply controlling unit 25 of the completion of the header processing, by driving a header processing end signal high.

The high speed interface 15 outputs a transport packet and stuffing data outputted from the header processing unit 13, via the external interface 12 to the digital AV device or the personal computer connected outside of the set-top box.

The payload processing unit 16 includes the formatting unit 17 and the filtering unit 18. The payload processing unit 16 extracts a PES data portion from a payload of a transport packet outputted from the header processing unit 13, and transfers the PES data portion to the SDRAM 19 so as to add it to the end of an elementary stream stored therein.

In this payload processing unit 16, the formatting unit 17 performs one of the seven operations that are: output of a transport packet itself; extraction of a payload from the transport packet; extraction of a PES packet from the transport packet; extraction of a PES stream from the transport packet; extraction of a section from the transport packet; rejection of the transport packet; and extraction of an adaptation field from the transport packet. In the third row of FIG. 5, the part with the solid lines represents the input of the payload in the formatting unit 17, which starts 9 clocks (header input period (4 clocks)+header processing period (5 clocks)) after the input of the header in the TSP header processor 14. Following this, the formatting unit 17 outputs the formatting result to the filtering unit 18 after an interval of 1 clock (formatting period).

The filtering unit 18 holds various identifiers beforehand. If a payload of a transport packet outputted from the header processing unit 13 contains any of the identifiers held in the filtering unit 18, the filtering unit 18 outputs a PES data portion contained in the payload to the DMA manager 20 so that the PES data portion is written at the end of an elementary stream stored in the SDRAM 19. If the payload does not contain any of the identifiers held in the filtering unit 18, the filtering unit 18 rejects the transport packet. In the fourth row in FIG. 5, the part with the solid lines represents the input of the payload in the filtering unit 18. As illustrated, the input of the payload in the filtering unit 18 starts 10 clocks (header input period (4 clocks)+header processing period (5 clocks)+formatting period (1 clock)) after the input of the header in the TSP header processor 14. Following this, the filtering unit 18 starts outputting the filtering result (PES data) after an interval of 1 to 25 clocks (filtering period). In the fifth row in FIG. 5, the parts with the solid lines represents the PES data outputted as a result of the operations by the formatting unit 17 and filtering unit 18. Here, only data which has undergone the formatting and the filtering in the payload processing unit 16 is outputted to the SDRAM 19.

In FIG. 5, a header input start time 801 denotes a time at which the input of the header into the header processing unit 13 (TSP header processor 14) starts. A header input end time 802 denotes a time at which the input of the header into the TSP header processor 14 ends. A header processing end time 803 denotes a time at which the processing of the header in the TSP header processor 14 ends. A payload processing end time 804 denotes a time at which the input of the payload into the filtering unit 18 ends. A transport packet input end time 816 denotes a time at which the input of the transport packet into the TSP header processor 14 ends. A PES data output end time 817 denotes a time at which the output of the PES data portion from the filtering unit 18 ends. As can be seen from the figure, there is an interval of 10 to 30 clocks between the transport packet input end time 816 and the PES data output end time 817. Once the formatting and the filtering have completed, the payload processing unit 16 notifies the clock supply controlling unit 25 of the payload processing end time 804, by driving a payload processing end signal high. Note here that the formatting and the filtering in the payload processing unit 16 are not required in some cases. For example, when the payload processing cancel signal from the header processing unit 13 indicates that payload processing is unnecessary, the formatting and the filtering are not performed.

The SDRAM 19 has a plurality of storage areas each for storing a demultiplexed elementary stream.

The DMA manager 20 writes a PES data portion outputted from the payload processing unit 16, into the SDRAM 19 by DMA transfer. As a result, PES data portions of the same PID are arranged in the same storage area in the SDRAM 19. By such arrangements of PES data portions, the original MPEG elementary streams such as video and audio streams are formed in the SDRAM 19. Subsequently, when instructed by the AV decoder 22 to read the elementary streams, the DMA manager 20 reads the elementary streams from the SDRAM 19 and outputs them to the AV decoder 22 through the AV decoder interface 21.

Figure 6A:
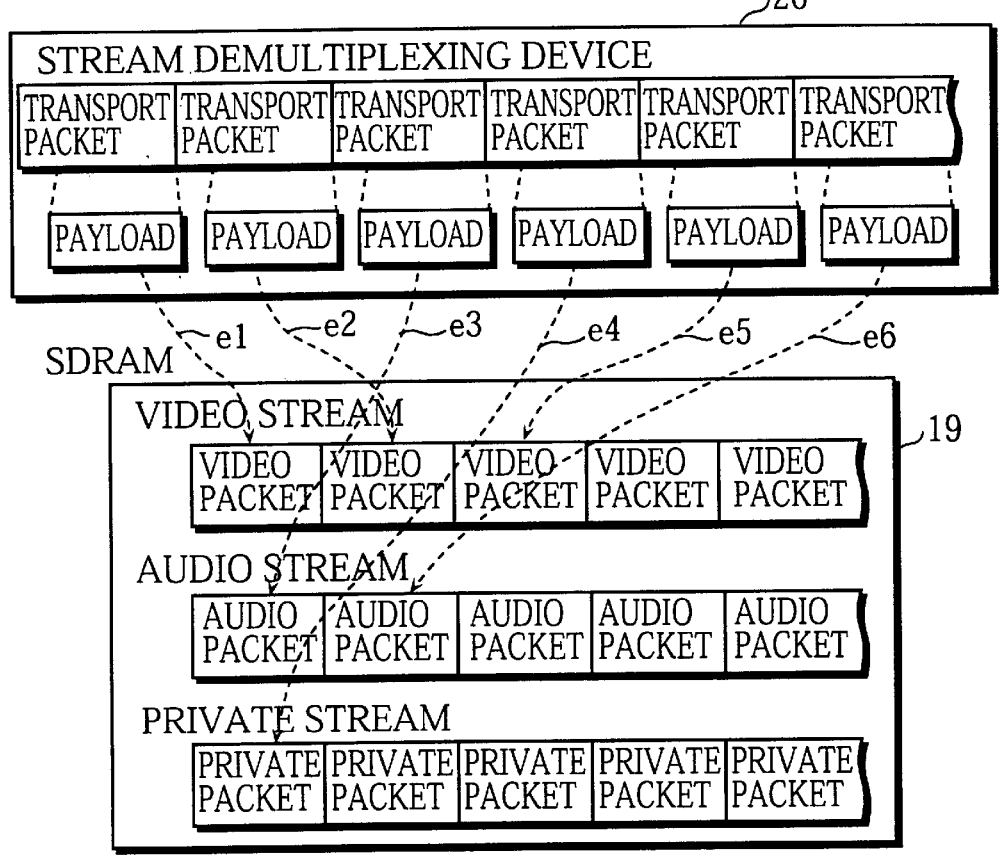
FIG. 6A shows how PES data portions are extracted from payloads of transport packets and combined into video, audio, and private streams in the SDRAM 19, after formatting and filtering in a payload processing unit 16 in FIG. 3.

FIG. 6A shows how PES data portions are extracted from payloads of transport packets in the payload processing unit 16 and integrated into a video stream, an audio stream, and a private stream in the SDRAM 19.

In the figure, the first row shows the transport packets, the second row shows the payloads in the transport packets, and the third to fifth rows show the video, audio, and private streams that are respectively made up of a plurality of video packets, a plurality of audio packets, and a plurality of private packets. PES data portions are extracted respectively from the payloads of the transport packets and transferred to the SDRAM 19 so as to form the video, audio, and private streams, as designated by the arrows e1 to e6.

The AV decoder 22 instructs the DMA manager 20 to read the elementary streams from the SDRAM 19, and decodes the elementary streams based on their stream types. If a video stream is read from the SDRAM 19, the AV decoder 22 decodes the video stream and outputs a video signal. If an audio stream is read from the SDRAM 19, the AV decoder 22 decodes the audio stream and outputs an audio signal.

Figure 6B:
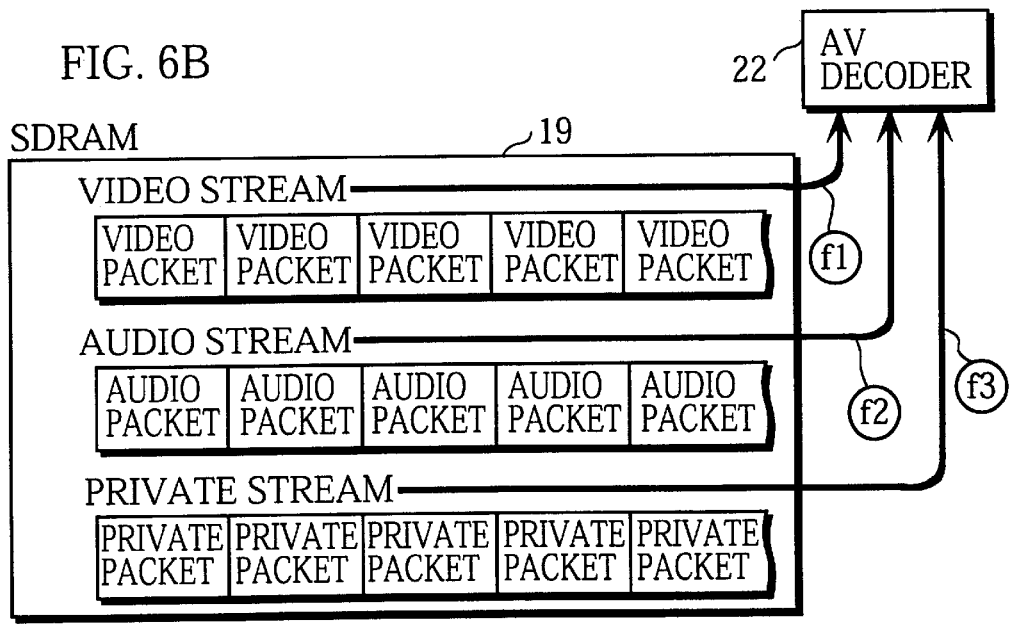
FIG. 6B shows how video, audio, and private streams are read from the SDRAM 19 into the AV decoder 22.

FIG. 6B shows how video, audio, and private streams are read from the SDRAM 19 to the AV decoder 22. The AV decoder 22 instructs the DMA manager 20 to read the elementary streams by DMA transfer. When the video, audio, and private streams are read from the SDRAM 19 to the AV decoder 22 as shown by the arrows f1 to f3, the AV decoder 22 decodes the video and audio streams to reproduce video and audio.

The microprocessor 23 controls input/output in the set-top box, and sets various parameters in the TSP header processor 14, the formatting unit 17, and the filtering unit 18 through the I/O bus interface 24.

The clock supply controlling unit 25 is a special purpose circuit for controlling supply of the synchronous clock signal from the clock generator 9 to the header processing unit 13 and the payload processing unit 16. The clock supply controlling unit 25 is the key feature of the invention.

FIG. 7 shows the construction of the stream demultiplexing device 26, where the connections of the clock supply controlling unit 25 with the stream preprocessing unit 10, the header processing unit 13, and the payload processing unit 16 are simplified for the sake of clarity. Of the construction elements shown in FIG. 3, only those which are particularly important to the present invention are shown in FIG. 7. In the figure, the stream preprocessing unit 10 outputs the packet start signal and the valid data signal to the clock supply controlling unit 25, whereas the clock generator 9 outputs the synchronous clock signal to the stream preprocessing unit 10. The header processing unit 13 outputs the header processing end signal and the payload processing cancel signal to the clock supply controlling unit 25, whereas the clock supply controlling unit 25 outputs the synchronous clock signal to the header processing unit 13. The payload processing unit 16 outputs the payload processing end signal to the clock signal controlling unit 25, whereas the clock supply controlling unit 25 outputs the synchronous clock signal to the payload processing unit 16.

The supply of the synchronous clock signal to the header processing unit 13 and the payload processing unit 16 is controlled to reduce power consumption in the stream demultiplexing device 26. The reason that the header processing unit 13 and the payload processing unit 16 are subjected to such control of the synchronous clock signal supply is given below.

Among the AV decoder 22, the stream demultiplexing device (transport decoder) 26, and the microprocessor 23 shown in FIG. 1, power consumption in the AV decoder 22 is significant as the decoding of video and audio streams draws substantial amounts of power. As mentioned earlier, however, the AV decoder 22 cannot launch the decoding unless a complete video or audio stream is formed in the SDRAM 19, while the time at which the video or audio stream is formed in the SDRAM 19 is not fixed. This means the decode timing of the AV decoder 22 is irregular. Since it is impossible to know in advance when the AV decoder 22 becomes active and when the AV decoder 22 becomes idle, the synchronous clock signal has to be constantly supplied to the AV decoder 22 so that synchronization can be established whenever a video or audio stream is read into the AV decoder 22. Likewise, the synchronous clock signal has to be constantly supplied to the microprocessor 23, as its timings of controlling input/output in the set-top box and setting parameters in the header processing unit 13 and the payload processing unit 16 are not fixed either.

This leaves the stream demultiplexing device 26 as the sole object of the control of the synchronous clock signal supply. Nevertheless, it is not possible to apply the control of the synchronous clock signal supply to all construction elements of the stream demultiplexing device 26. In particular, the synchronous clock signal supply to the stream preprocessing unit 10 cannot be cut off, as it incessantly receives a transport packet and stuffing data from the demodulation LSIs 4 to 6.

In the header processing unit 13 and the payload processing unit 16, on the other hand, a header, a payload, and stuffing data are repeatedly inputted in this order. The header processing unit 13 stays idle while a payload and stuffing data are being inputted in the header processing unit 13. Similarly, the payload processing unit 16 stays idle while stuffing data and a header are being inputted in the payload processing unit 16. Thus, the data input periods and the data processing periods in the header processing unit 13 and the payload processing unit 16 are determined by the input timings of a header, a payload, and stuffing data from the stream preprocessing unit 10. Accordingly, the synchronous clock signal does not have to be supplied to the header processing unit 13 except when a header is being inputted and processed in the header processing unit 13. In a like manner, the synchronous clock signal does not have to be supplied to the payload processing unit 16 except when a payload is being inputted and processed in the payload processing unit 16.

Hence the clock supply controlling unit 25 supplies the synchronous clock signal to the header processing unit 13 only when a header is being inputted and processed in the header processing unit 13, and supplies the synchronous clock signal to the payload processing unit 16 only when a payload is being inputted and processed in the payload processing unit 16.

Figure 9A:
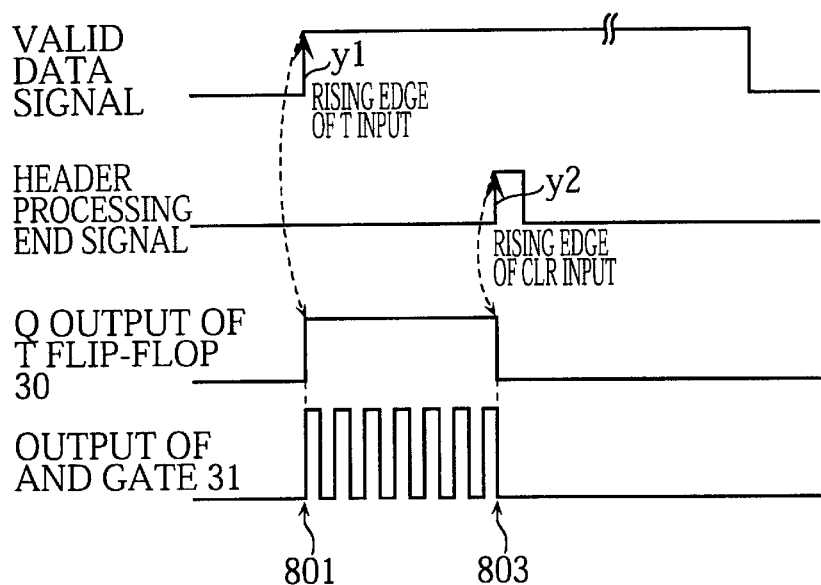
FIG. 9A is a timing chart showing input/output of a T flip-flop in FIG. 8.
Figure 9B:
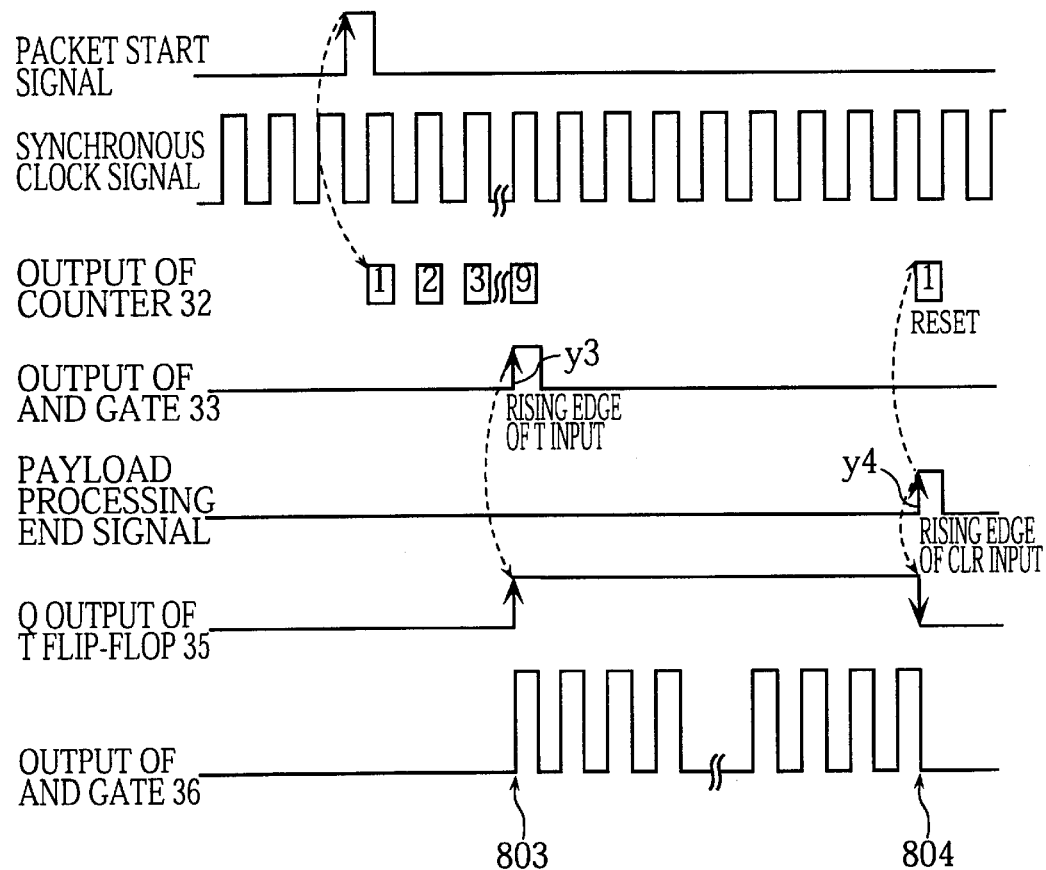
FIG. 9B is a timing chart showing input/output of a T flip-flop 35 in FIG. 8.

FIG. 8 shows the construction of the clock supply controlling unit 25. This clock supply controlling unit 25 is provided with a T flip-flop 30, an AND gate 31, a counter 32, an AND gate 33, an OR gate 34, a T flip-flop 35, and an AND gate 36. FIG. 9A is a timing chart showing input/output of the T flip-flop 30, whereas FIG. 9B is a timing chart showing input/output of the T flip-flop 35.

In the T flip-flop 30, the Q output is driven high when the valid data signal in the T input goes high, and is driven low when the header processing end signal in the CLR input goes high. The state of the Q output in the T flip-flop 30 is shown in the third row of FIG. 9A. The Q output stays high between the rising edge y1 of the valid data signal and the rising edge y2 of the header processing end signal, as shown in the figure.

The output of the AND gate 31 is normally low, and supplies the synchronous clock signal to the header processing unit 13 only when the Q output of the T flip-flop 30 is being held high. The state of the output of the AND gate 31 is shown in the fourth row of FIG. 9A. The AND gate 31 supplies the synchronous clock signal to the header processing unit 13 while the Q output of the T flip-flop 30 is high (i.e. from the header input start time 801 to the header processing end time 803), as shown in the figure.

The counter 32 starts counting when the packet start signal goes high, and outputs the count which corresponds to the number of pulses of the synchronous clock signal. The count is reset when the output of the OR gate 34 becomes high.

The output of the AND gate 33 goes high when the count outputted from the counter 32 reaches a threshold value "9

(=1001)". The states of the outputs of the counter 32 and AND gate 33 are shown in the third and fourth rows of FIG. 9B. The counter 32 is incremented 1, 2, ..., and 9, at which point the rising edge y3 occurs in the output of the AND gate 33. The value "9" is the number of pulses in the synchronous clock signal outputted from the clock generator 9 during the header input period and the header processing period shown in FIG. 5. In short, the count "9" in the counter 32 signifies the header processing unit 13 has finished inputting and processing a header.

The output of the OR gate 34 is driven high when either the payload processing cancel signal or the payload processing end signal goes high.

In the T flip-flop 35, the Q output is driven high when the T input goes high, and is driven low when the CLR input goes high. The state of the Q output in the T flip-flop 35 is shown in the sixth row in FIG. 9B. The Q output remains high between the rising edge y3 of the output of the AND gate 33 and the rising edge y4 of the payload processing end signal, as shown in the figure.

The output of the AND gate 36 is normally low, and supplies the synchronous clock signal to the payload processing unit 16 only when the Q output of the T flip-flop 35 is being held high. The state of the output of the AND gate 36 is shown in the seventh row in FIG. 9B. The AND gate 36 supplies the synchronous clock signal to the payload processing unit 16 while the Q output of the T flip-flop 35 stays high (i.e. from the header processing end time 803 to the payload processing end time 804), as shown in the figure.

Figure 10:
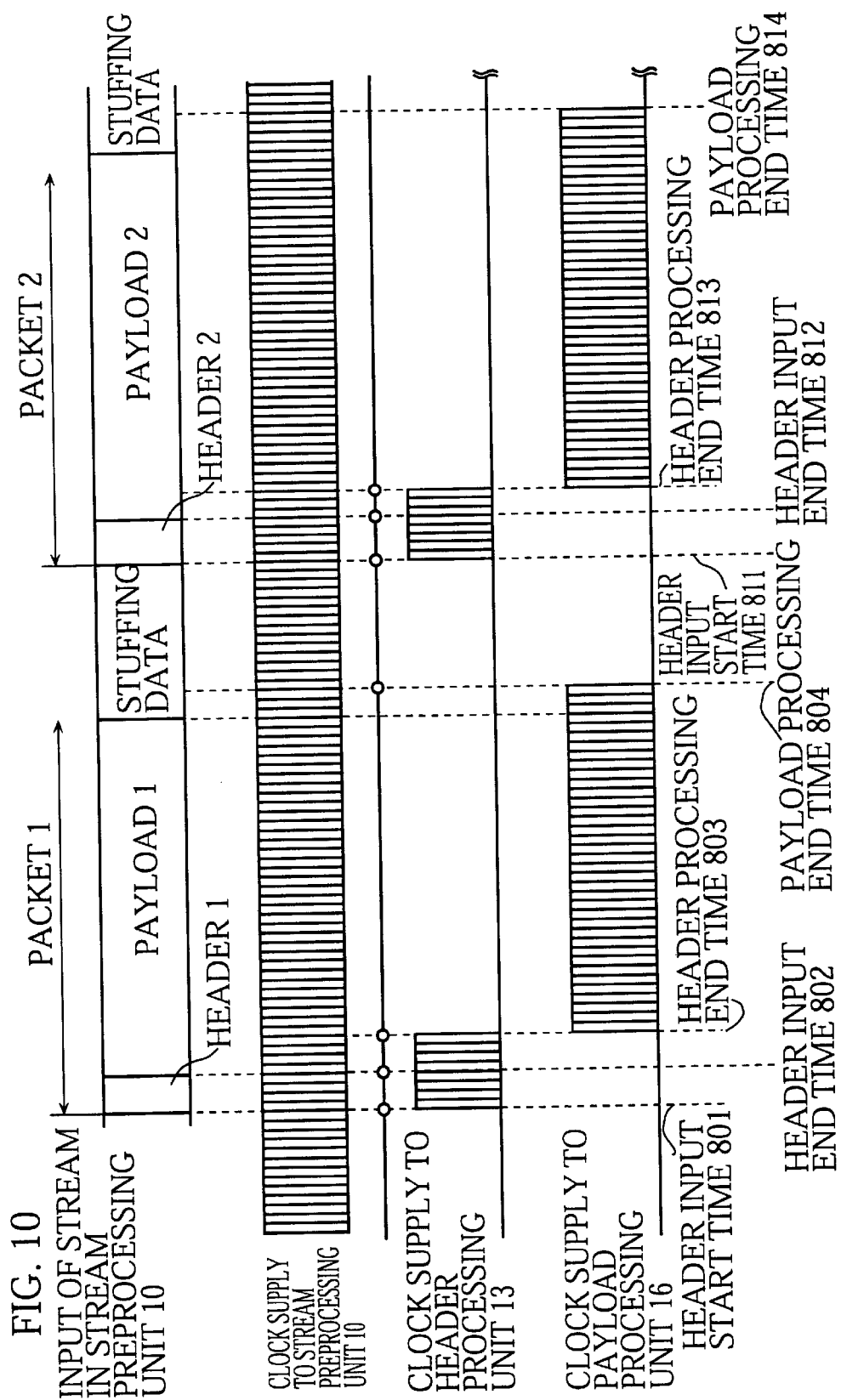
FIG. 10 is a timing chart showing how a synchronous clock signal is supplied to a header processing unit 13 and the payload processing unit 16 under control of the clock supply controlling unit 25.

FIG. 10 is a timing chart showing how the synchronous clock signal is supplied to the header processing unit 13 and the payload processing unit 16 under control of the clock supply controlling unit 25.

The AND gate 31 starts supplying the synchronous clock signal to the header processing unit 13 at the header input start time 801, and stops the clock supply at the header processing end time 803 when the Q output of the T flip-flop 30 becomes low. After this, the synchronous clock signal supply to the header processing unit 13 is cut off until a header input start time 811 of the next transport packet (transport packet 2).

Meanwhile, the AND gate 36 starts supplying the synchronous clock signal to the payload processing unit 16 at the header processing end time 803 when the output of the AND gate 33 goes high and the Q output of the T flip-flop 35 goes high. The AND gate 36 continues the clock supply until the payload processing end time 804 when the Q output of the T flip-flop 35 becomes low. After this, the synchronous clock signal supply to the payload processing unit 16 is cut off until a header processing end time 813 of transport packet 2.

Suppose the header processing unit 13 and the payload processing unit 16 can fetch 1 data byte per clock. Given that the header size is 4 bytes, the payload size is 184 bytes, and the stuffing data size is 16 bytes, the time (L) taken for inputting a transport packet and stuffing data is 204 clocks, the time (p1) taken for inputting a header is 4 clocks, the time (p2) taken for processing the header is 5 clocks, and the time (h) taken for inputting and processing a payload is 184 clocks at the maximum. With this embodiment, the time of synchronous clock signal supply to the header processing unit 13 is reduced approximately to 4.4% ((p1+p2)/L=(4+5)/204), and the time of synchronous clock signal supply to the payload processing unit 16 is reduced approximately to 90% (h/L=184/204).

Thus, as long as sequential inputs of a header, a payload, and stuffing data are repeated in the stream demultiplexing device 26, power consumption is steadily reduced by the above percentages.

While in this embodiment the clock supply controlling unit 25 stops the clock supply to the payload processing unit 16 when the filtering unit 18 ends the input of the payload (payload processing end time 804), the clock supply may be stopped when the filtering unit 18 ends the output of the PES data portion.

The clock supply controlling unit 25 regularly controls synchronous clock signal supply in the above described manner. In addition, the clock supply controlling unit 25 also controls synchronous clock signal supply based on header analysis by the header processing unit 13.

Figure 11:
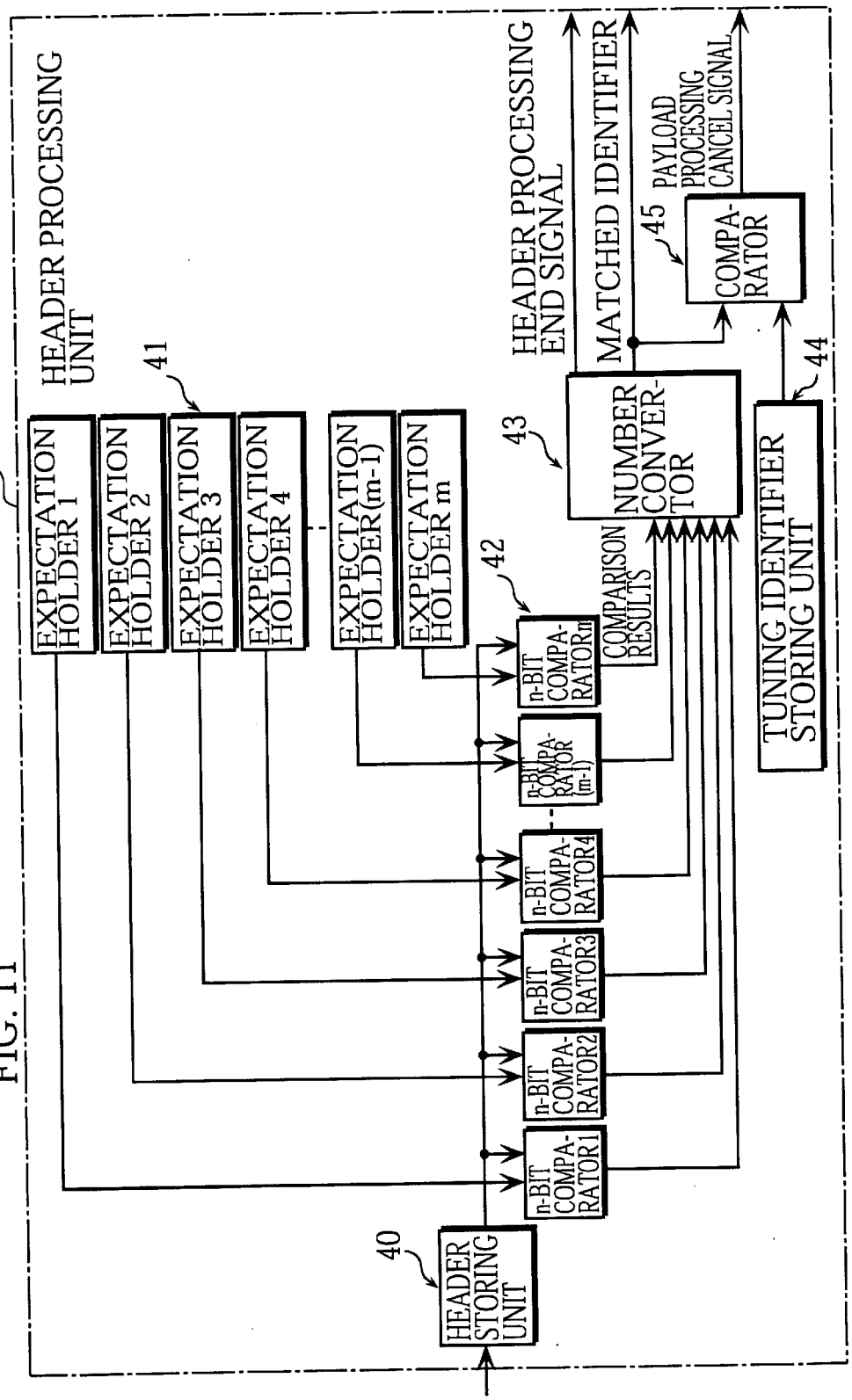
FIG. 11 shows the construction of the header processing unit 13.

The following is an explanation on how the clock supply controlling unit 25 controls synchronous clock signal supply based on header analysis by the header processing unit 13. FIG. 11 shows the construction of the header processing unit 13. This header processing unit 13 is roughly made up of a header storing unit 40, m expectation holders 41, m comparators 42, a number convertor 43, a tuning identifier storing unit 44, and a comparator 45.

The header storing unit 40 stores a header of a transport packet transferred from the stream preprocessing unit 10.

The m expectation holders 41 each hold a different expectation (identifier) to be compared with the PID of the header stored in the header storing unit 40.

The m comparators 42 compare n-bit data (PID) of the header with the expectations held respectively in the m expectation holders 41, in sync with the synchronous clock signal generated by the clock generator 9.

The number convertor 43 receives the comparison results from the m comparators 42, and outputs a matched PID showing which of the expectations in the m expectation holders 41 matches the PID of the header. The number convertor 43 then drives the header processing end signal high, to notify the clock supply controlling unit 25 of the completion of the header processing.

The tuning identifier storing unit 44 stores a tuning identifier which is identical to one of the identifiers (expectations) held in the m expectation holders 41. The tuning identifier specifies the contents of a header included in a transport packet whose payload needs to be processed. Here, tuning is the act of the user designating a broadcast program he or she wishes to watch in the set-top box, and the tuning identifier is the identifier set in the set-top box for the user-designated broadcast program.

The comparator 45 compares the tuning identifier in the tuning identifier storing unit 44 with the matched PID outputted from the number convertor 43. If they do not match, the comparator 45 drives the payload processing cancel signal high, to notify the clock supply controlling unit 25 that the processing of the payload is unnecessary. In so doing, if a transport packet of a broadcast program other than the user-designated broadcast program is inputted in the header processing unit 13, that transport packet is rejected as soon as a mismatch with the tuning identifier is detected.

Figure 12:
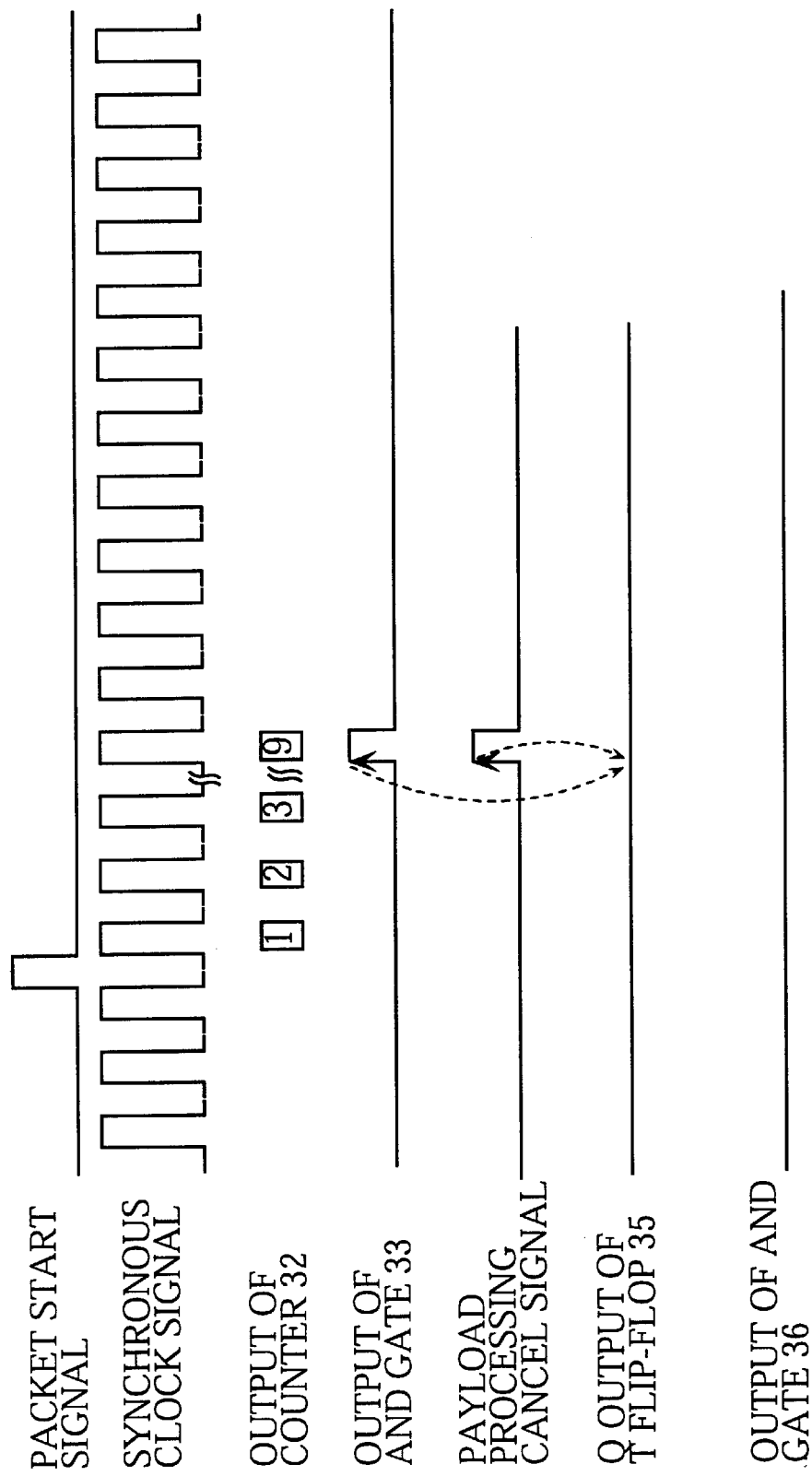
FIG. 12 is a timing chart showing input/output of the T flip-flop when a comparator 45 in FIG. 11 detects a mismatch with a tuning identifier.
Figure 13:
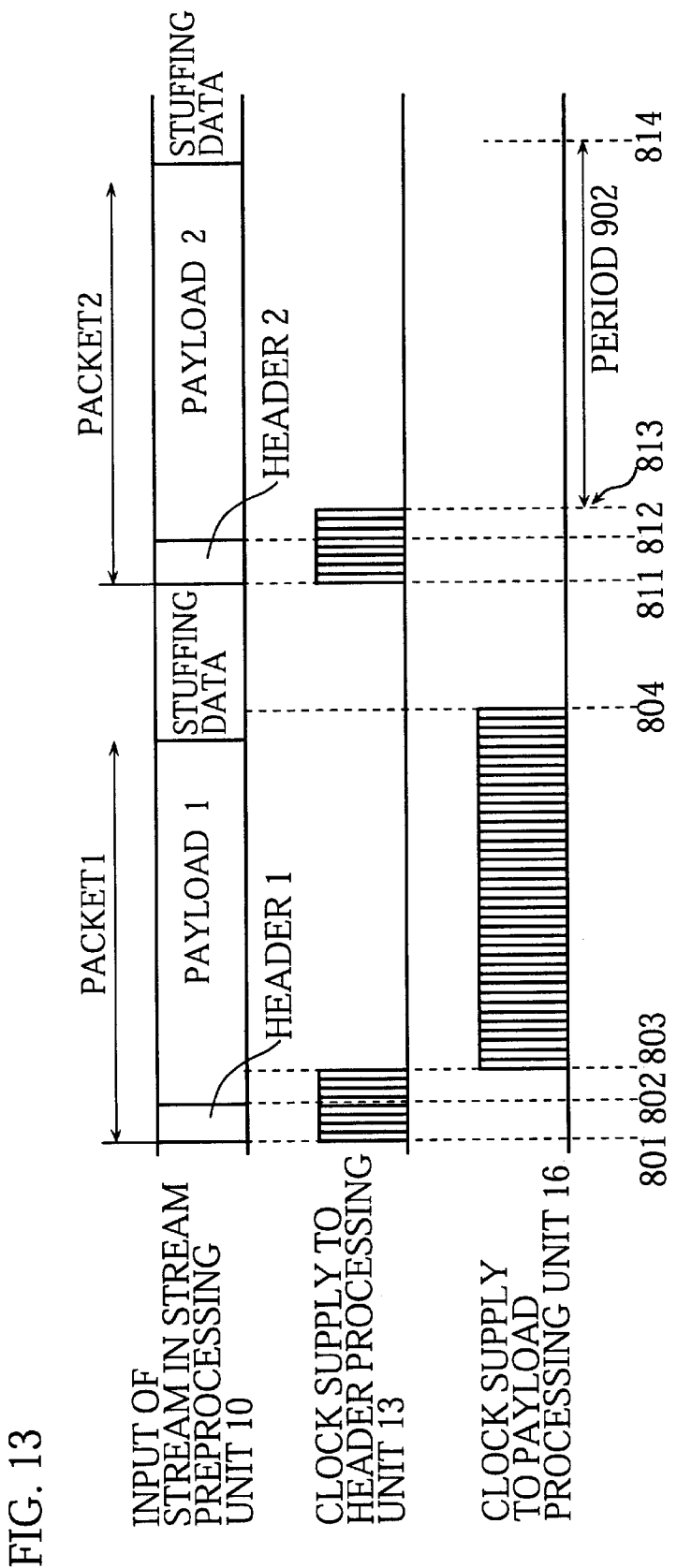
FIG. 13 is a timing chart showing how the synchronous clock signal is supplied in the case of FIG. 12.

In accordance with such a payload processing cancel signal from the header processing unit 13, the clock supply controlling unit 25 controls synchronous clock signal supply to the payload processing unit 16 as shown in FIGS. 12 and 13.

FIG. 12 is a timing chart showing input/output of the T flip-flop 35 in the clock supply controlling unit 25 when the comparator 45 in the header processing unit 13 detects a mismatch with the tuning identifier. Though the first to fourth rows in the figure are similar to those in FIG. 9B, the fifth to seventh rows differ with those in FIG. 9B. The fifth row in FIG. 12 shows the payload processing cancel signal, instead of the payload processing end signal which goes high when payload processing in the payload processing unit 16 ends. Due to the mismatch with the tuning identifier, the rising edge of the payload processing cancel signal occurs earlier than that of the payload processing end signal in FIG. 9B. Since the output of the OR gate 34 in FIG. 8 becomes high when either the payload processing end signal or the payload processing cancel signal becomes high, in FIG. 12 the CLR input of the T flip-flop 35 goes high at the rising edge of the payload processing cancel signal, as a result of which the Q output of the T flip-flop 35 stays low. As long as the Q output of the T flip-flop 35 stays low, the synchronous clock signal is not supplied to the payload processing unit 16.

FIG. 13 shows how the synchronous clock signal is supplied to the header processing unit 13 and the payload processing unit 16 under control of the clock supply controlling unit 25, in the case of FIG. 12. For transport packet 1, the synchronous clock signal is being supplied to the payload processing unit 16 from the header processing end time 803 to the payload processing end time 804, at which point the clock supply is cut off by the rise of the payload processing end signal. For transport packet 2, meanwhile, the synchronous clock signal is not supplied to the payload processing unit 16 at all, due to the rise of the payload processing cancel signal (a period 902 from the header processing end time 813 to the payload processing end time 814 is a period during which the synchronous clock signal would have been supplied if the payload processing cancel signal remained low).

According to the first embodiment, the synchronous clock signal is not supplied to the header processing unit 13 except when a header is being inputted and processed in the header processing unit 13, and is not supplied to the payload processing unit 16 except when a payload is being inputted and processed in the payload processing unit 16. As a result, the periods of supplying the synchronous clock signal to the header processing unit 13 and the payload processing unit 16 are shortened, with it being possible to reduce power consumption in the stream demultiplexing device 26.

Second Embodiment

In the second embodiment of the invention, the filtering unit 18 in the first embodiment is replaced with a section filter.

The section filter prestores a plurality of section parameters each for selecting a section, and performs section filtering on a transport packet transferred from the header processing unit 13. The section filtering is the following. When a transport packet is transferred from the header processing unit 13, an identifier is retrieved from its payload, and it is judged whether the retrieved identifier, corresponds to any of the section parameters in the section filter. If the identifier corresponds to any of the section parameters, the section filter outputs a PES data portion contained in the payload of the transport packet. Otherwise, the section filter rejects the transport packet.

Suppose the user inputs his or her favorite genre in the set-top box, and a section parameter corresponding to that genre is registered in the section filter. If the payload of the transport packet transferred from the header processing unit 13 has an identifier corresponding to the registered section parameter, the section filter outputs the PES data portion contained in the payload to the SDRAM 19. Otherwise, the section filter rejects the transport packet. For example, if the user inputs "sports" as the favorite genre, then the section filter outputs only PES data portions of transport packets which relate to the genre "sports", and rejects all transport packets which relate to the other genres such as "movies".

If the transport packet from the header processing unit 13 does not correspond to any of the section parameters in the section filter, the section filter outputs a payload processing cancel signal of high level to the clock supply controlling unit 25, without processing the transport packet. In the above example, the section filter drives the payload processing cancel signal high, if the transferred transport packet relates to an irrelevant genre such as "movies". When this happens, the output of the OR gate 34 goes high and the Q output of the T flip-flop 35 becomes low, thereby prohibiting the AND gate 36 from supplying the synchronous clock signal to the payload processing unit 16.

Figure 14:
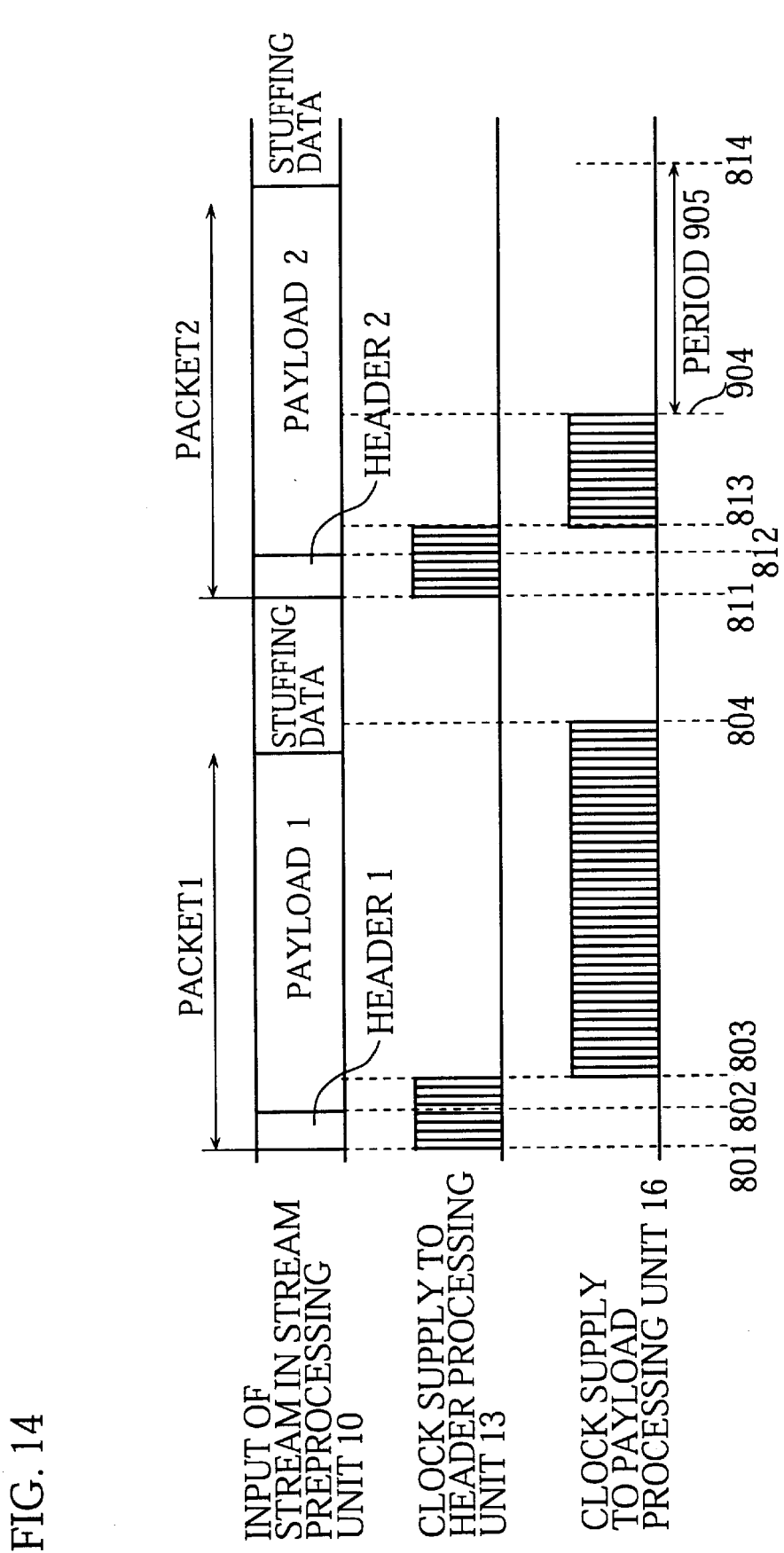
FIG. 14 is a timing chart showing how the synchronous clock signal is supplied when a payload processing cancel signal is driven high at a time 904 before a payload processing end time 814, due to section filtering by a section filter in a stream demultiplexing device 26 according to the second embodiment of the invention.

FIG. 14 shows how the synchronous clock signal is supplied to the header processing unit 13 and the payload processing unit 16 when the section filter performs section filtering and drives the payload processing cancel signal high at a time 904 before the payload processing end time 814. In this case, the synchronous clock signal supply to the payload processing unit 16 is cut off at the time 904, as a result of which the clock supply period (from the header processing end time 813 to the payload processing end time 814) in FIG. 10 is further shortened by a period 905.

According to this embodiment, when a transport packet inputted in the payload processing unit 16 does not correspond to any of the section parameters held in the section filter, the section filter notifies the clock supply controlling unit 25 that the payload processing is unnecessary by driving the payload processing cancel signal high, without processing the transport packet. In so doing, the supply of the synchronous clock signal to the payload processing unit 16 is cut off earlier than in the case of regular control in the first embodiment, with it being possible to further reduce power consumption in the stream demultiplexing device 26.

Third Embodiment

In the third embodiment of the invention, one of the plurality of elementary streams multiplexed in the transport stream has been encrypted for protection against unauthorized acts such as duplication and tampering.

Figure 15:
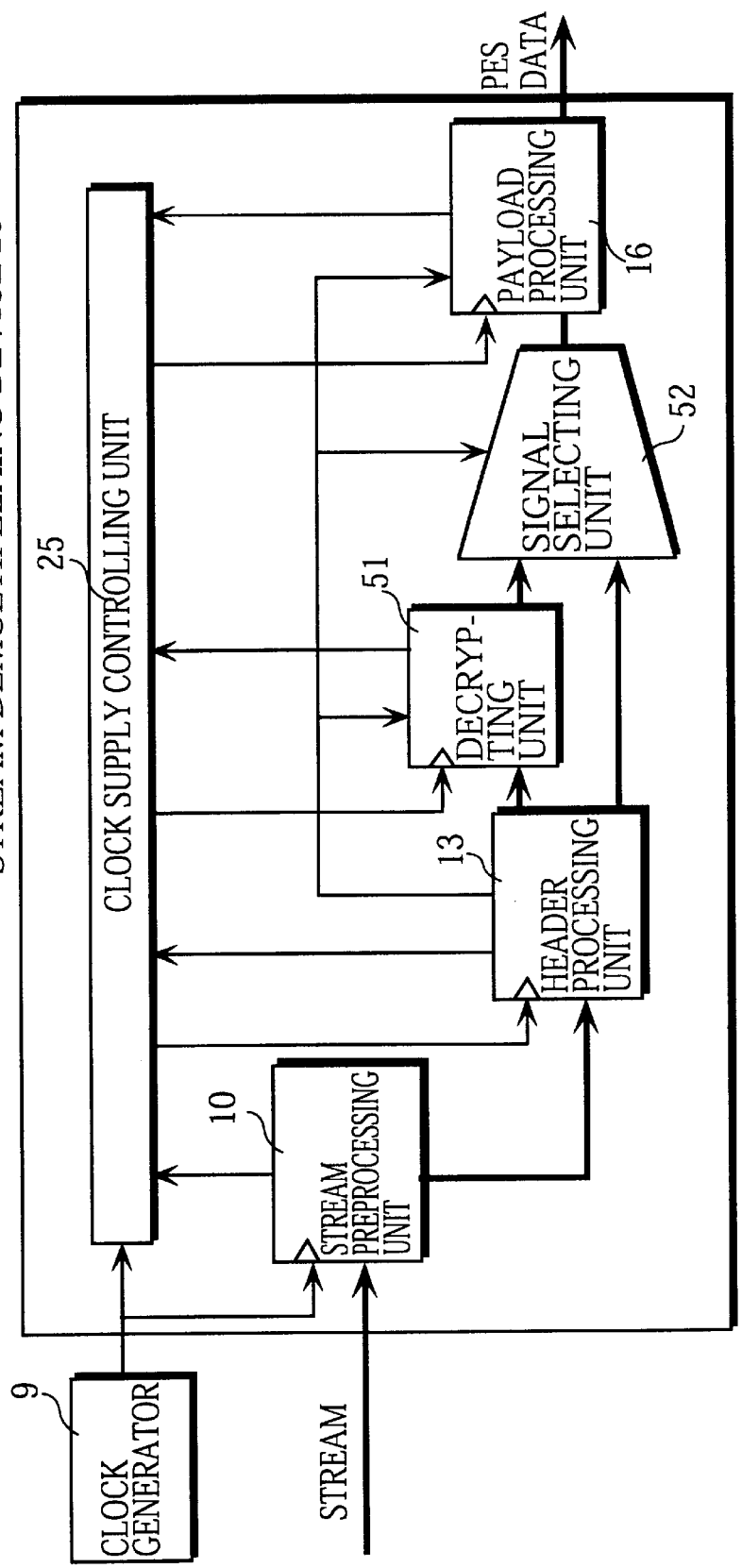
FIG. 15 shows the construction of a stream demultiplexing device 26 according to the third embodiment of the invention.

FIG. 15 shows the construction of a stream demultiplexing device 26 according to the third embodiment. When compared with FIG. 7, a decrypting unit 51 and a signal selecting unit 52 are newly included in this stream demultiplexing device 26.

The decrypting unit 51 holds an identifier identifying the elementary stream which has been encrypted and a decryption key for decrypting the encrypted elementary stream, and performs the decryption based on the identifier and the decryption key. Here, the decryption by the decrypting unit 51 is conducted only when a matched PID outputted from the header processing unit 13 matches the identifier held in the decrypting unit 51. Otherwise, the decryption is not conducted. For a transport packet whose PID matches the identifier held in the decrypting unit 51, the decrypting unit 51 performs decryption in units of 8 to 10 bytes, rather than decrypting the entire transport packet at one time. Once data of 8 to 10 bytes has been read and decrypted, the decrypting unit 51 outputs the decrypted data to the signal selecting unit 52, and reads the next data and decrypts it. By repeating such reading, decryption, and output in units of 8 to 10 bytes, the entire transport packet is eventually decrypted. Having decrypted the entire transport packet, the decrypting unit 51 notifies the clock supply controlling unit 25 of the completion of the decryption, by driving a decryption end signal high.

The signal selecting unit 52 holds the identifier of the encrypted elementary stream as with the decrypting unit 51. If the matched PID from the header processing unit 13 matches the held identifier, the signal selecting unit 52 outputs a decrypted transport packet outputted from the decrypting unit 51, to the payload processing unit 16. Otherwise, the signal selecting unit 52 outputs a transport packet outputted from the header processing unit 13, to the payload processing unit 16.

Figure 16:
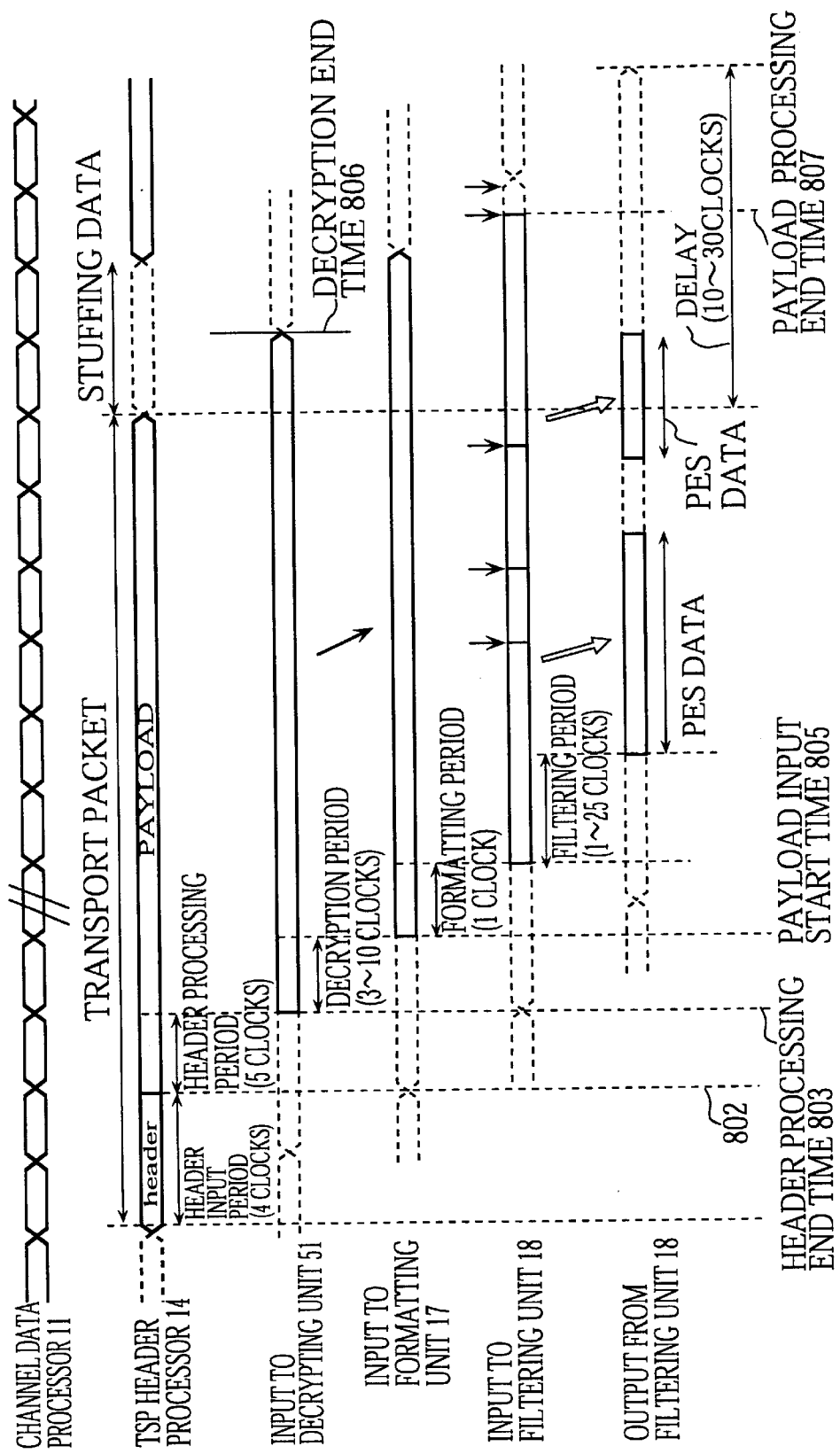
FIG. 16 is a timing chart showing input/output of a transport packet in the stream demultiplexing device 26 shown in FIG. 15.

FIG. 16 is a timing chart showing input/output of a transport packet in the stream demultiplexing device 26 shown in FIG. 15. When compared with FIG. 5, the decrypting unit 51 is newly added in FIG. 16.

In the first and second embodiments, the payload processing unit 16 starts the input of the payload at the header processing end time 803 and ends the processing of the payload at the payload processing end time 804, as shown in FIG. 5. In the third embodiment, on the other hand, the start of the payload input and the end of the payload processing in the payload processing unit 16 are delayed due to the presence of the decrypting unit 51 between the header processing unit 13 and the payload processing unit 16. Which is to say, the formatting unit 17 starts the input of the payload at a payload input start time 805, and the filtering unit 18 ends the processing of the payload at a payload processing end time 807 in FIG. 16.

The decrypting unit 51 starts decryption at the header processing end time 803 after the header input period (4 clocks) and the header processing period (5 clocks) have elapsed, and outputs the decryption results to the formatting unit 17 in sequence. The decrypting unit 51 ends the decryption at a decryption end time 806, at which point the decrypting unit 51 drives the decryption end signal high, to notify the clock supply controlling unit 25 of the completion of the decryption of the transport packet.

The clock supply controlling unit 25 in this stream demultiplexing device 26 of the third embodiment is constructed as follows.

Figure 17:
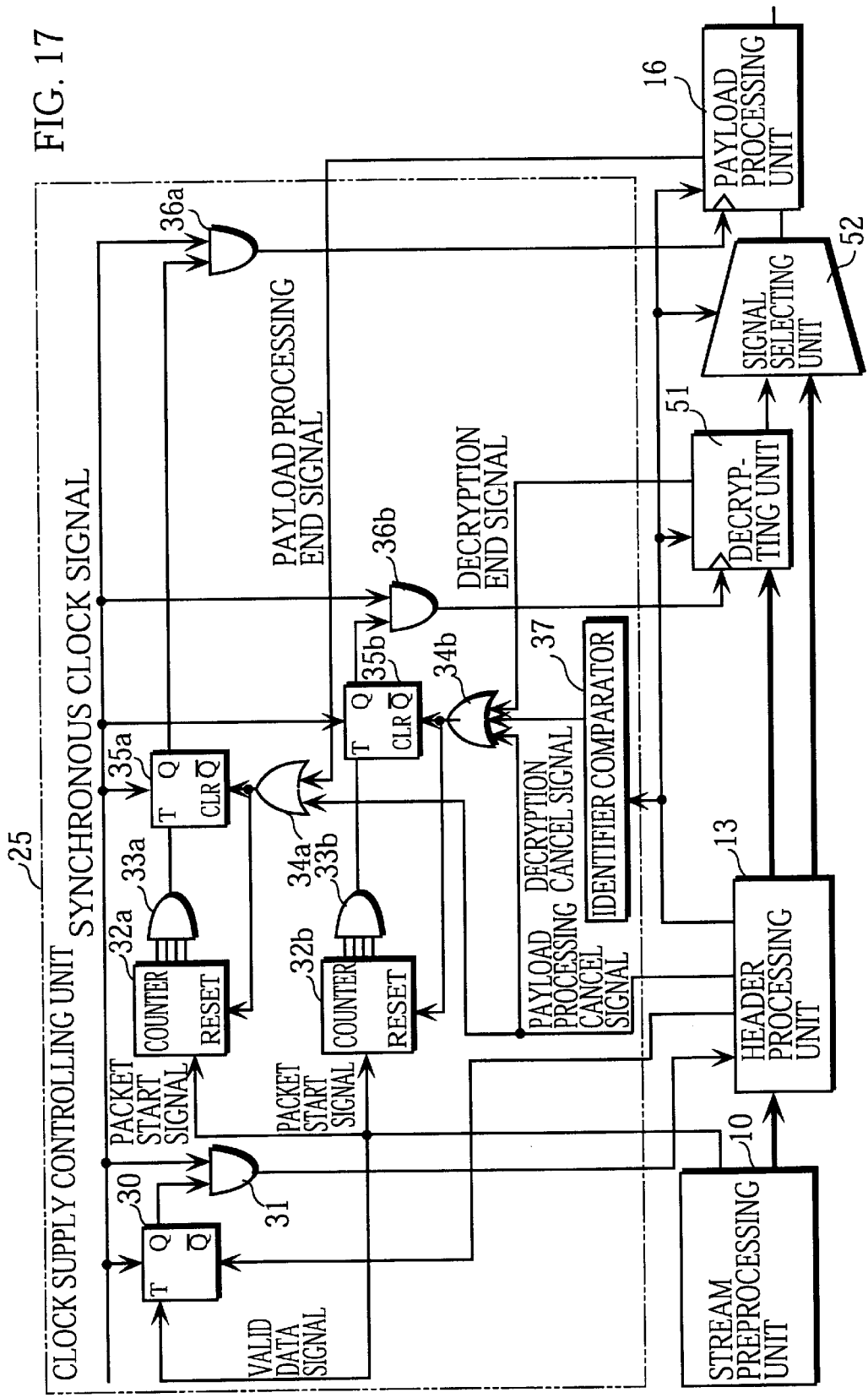
FIG. 17 shows the construction of a clock supply controlling unit 25 in FIG. 15.

FIG. 17 shows the construction of the clock supply controlling unit 25 shown in FIG. 15. The differences with FIG. 8 are that the counter 32, the AND gate 33, the OR gate 34, the T flip-flop 35, and the AND gate 36 are replaced with counters 32a and 32b, AND gates 33a and 33b, OR gates 34a and 34b, T flip-flops 35a and 35b, and AND gates 36a and 36b, and an identifier comparator 37 is newly included.

Among these construction elements, the counter 32a, the AND gate 33a, the OR gate 34a, the T flip-flop 35, and the AND gate 36a are used to supply the synchronous clock signal to the payload processing unit 16 as in the first embodiment, whereas the counter 32b, the AND gate 33b, the OR gate 34b, the T flip-flop 35b, and the AND gate 36b are used to supply the synchronous clock signal to the decrypting unit 51. Here, the AND gate 33b, the T flip-flop 35b, and the AND gate 36b have the same functions as the AND gate 33a, the T flip-flop 35a, and the AND gate 36a. The following explains the functions of the counters 32a and 32b, OR gate 34b, and identifier comparator 37.

The counter 32a starts counting when the packet start signal becomes high, and keeps counting until the count reaches 12 to 19 clocks (the header input period (4 clocks)+the header processing period (5 clocks)+the decryption period (3 to 10 clocks)). Though the threshold value of the counter 32 is "9" in the first embodiment, the threshold value of the counter 32a is "12" to "19" in the third embodiment, because of the presence of the decrypting unit 51 between the header processing unit 13 and the payload processing unit 16.

The counter 32b starts counting when the packet start signal becomes high, and keeps counting until the count reaches 9 clocks (the header input period (4 clocks)+the header processing period (5 clocks)). Here, the decryption end signal from the decrypting unit 51 may be fed into the T input of the T flip-flop 35b, so that the end of the decryption period can be monitored without the counter 32b being used. In this case, the decryption end time can be detected even if the decryption period is not fixed.

The output of the OR gate 34b goes high when one of the payload processing cancel signal from the header processing unit 13, the decryption cancel signal from the identifier comparator 37, and the decryption end signal from the decrypting unit 51 becomes high. As a result, the CLR input of the T flip-flop 35b is driven high. When, for instance, the decryption end signal becomes high, the CLR input of the T flip-flop 35b goes high and the Q output of the T flip-flop 35b becomes low, thereby preventing the AND gate 36b from supplying the synchronous clock signal to the decrypting unit 51.

The identifier comparator 37 holds the identifier of the encrypted elementary stream, as with the decrypting unit 51 and the signal selecting unit 52. When the matched PID outputted from the header processing unit 13 does not match the held identifier, the identifier comparator 37 drives the decryption cancel signal high. As mentioned earlier, the output of the OR gate 34b goes high when one of the decryption cancel signal, the decryption end signal, and the payload processing cancel signal is high. Accordingly, on the rise of the decryption cancel signal, the output of the OR gate 34b goes high and the CLR input of the T flip-flop 35b goes high, thereby making the Q output of the T flip-flop 35b low. When this happens, the AND gate 36b is prohibited from supplying the synchronous clock signal to the decrypting unit 51.

Figure 18:
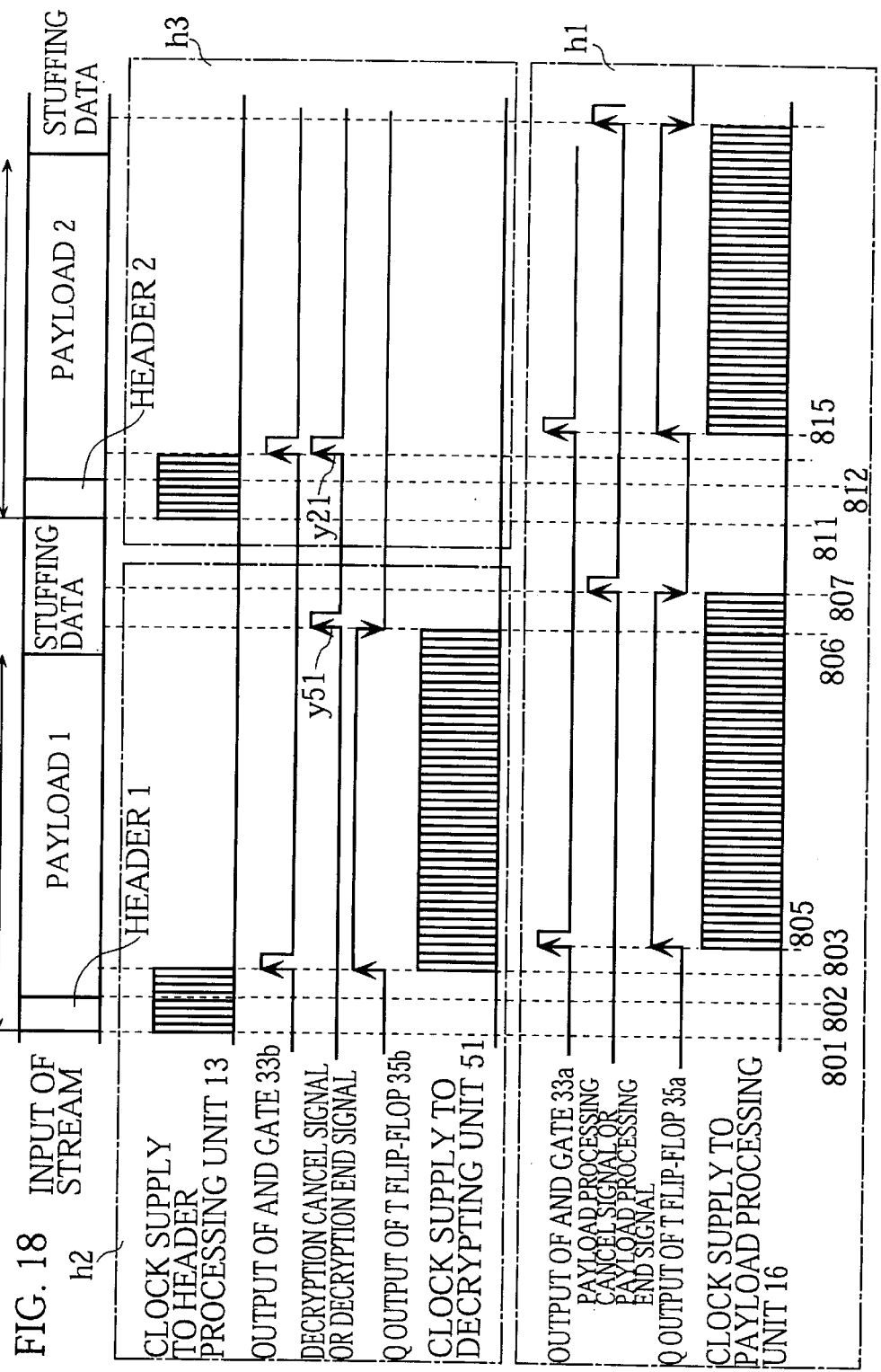
FIG. 18 is a timing chart showing how the synchronous clock signal is supplied to a decrypting unit 51 in FIG. 15.

FIG. 18 shows how the synchronous clock signal is supplied to the header processing unit 13, the decrypting unit 51, and the payload processing unit 16. The bottom part h1 illustrates synchronous clock signal supply to the payload processing unit 16 which is similar to that shown in FIG. 10. The top parts h2 and h3 illustrate synchronous clock signal supply to the header processing unit 13 and the decrypting unit 51. For transport packet 1, the states of the AND gate 33b and the T flip-flop 35b are analogous to those in FIG. 9B. Here, the AND gate 36b starts supplying the synchronous clock signal to the decrypting unit 51 at the header processing end time 803. When the decrypting unit 51 ends the decryption of transport packet 1 and the rising edge y51 of the decryption end signal occurs at the decryption end time 806, the AND gate 36 stops supplying the synchronous clock signal to the decrypting unit 51. Thus, for transport packet 1, the synchronous clock signal is supplied to the decrypting unit 51 from the header processing end time 803 to the decryption end time 806.

For transport packet 2, the identifier comparator 37 detects a mismatch between a matched PID sent from the header processing unit 13 and the identifier of the encrypted elementary stream. As a result, the rising edge y21 of the decryption cancel signal occurs, thereby preventing the AND gate 36b from supplying the synchronous clock signal to the decrypting unit 51. Thus, while the synchronous clock signal supply is cut off at the decryption end time 806 in the case of transport packet 1, the synchronous clock signal is not supplied to the decrypting unit 51 at all in the case of transport packet 2.

According to this embodiment, the time for supplying the synchronous clock signal to the decrypting unit 51 is shortened, so that power consumption in the stream demultiplexing device 26 is reduced. Given that a large number of flip-flops are mounted in the decrypting unit 51 for decryption, shortening the synchronous clock signal supply to the decrypting unit 51 delivers significant reduction in power consumption.

Fourth Embodiment

Figure 19:
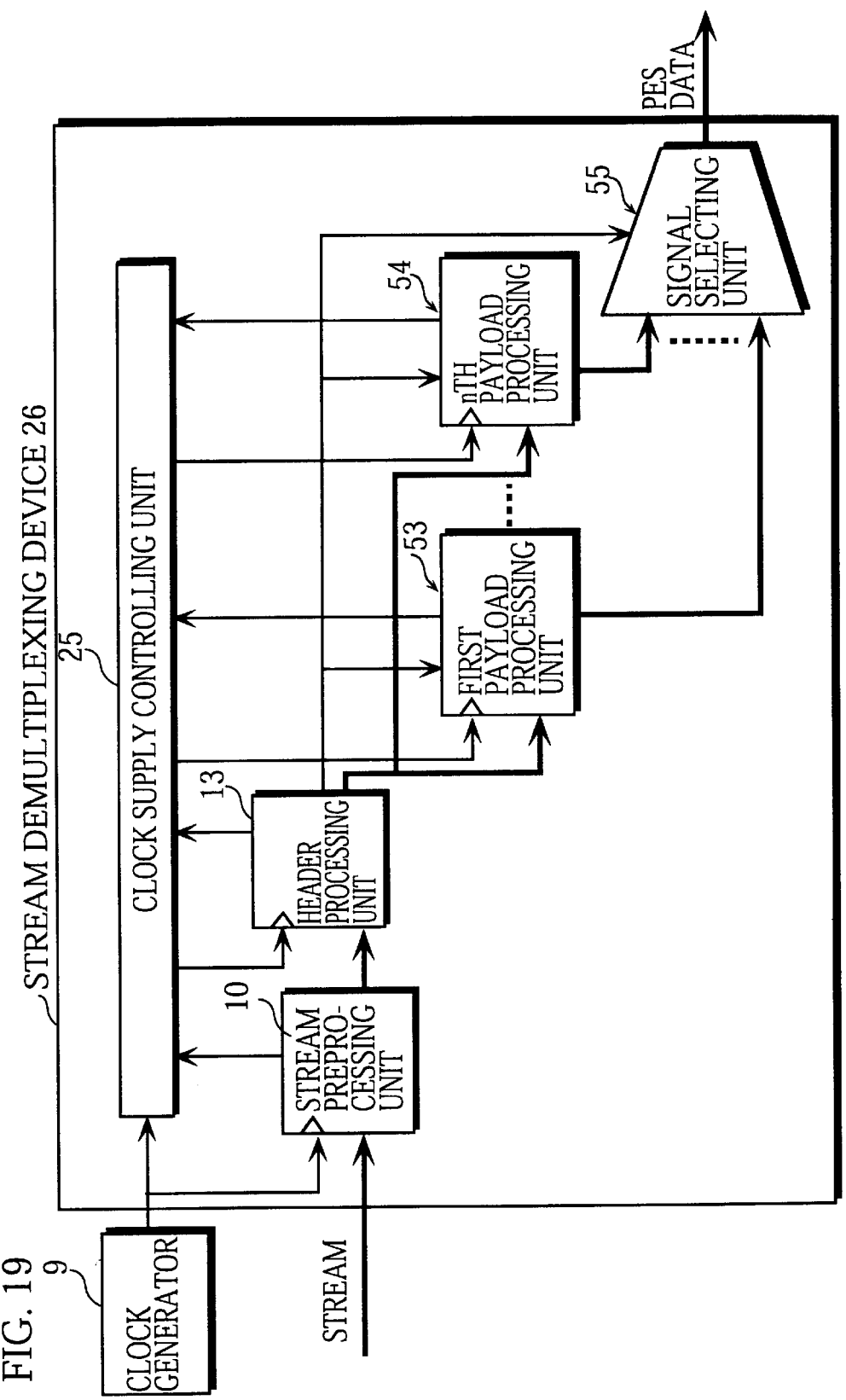
FIG. 19 shows the construction of a stream demultiplexing device 26 according to the fourth embodiment of the invention.

In the fourth embodiment of the invention, the single payload processing unit 16 in the first embodiment is replaced with n payload processing units. FIG. 19 shows the construction of a stream demultiplexing device 26 of the fourth embodiment, where the payload processing unit 16 shown in FIG. 7 is replaced with first to nth payload processing units 53 to 54 and a signal selecting unit 55 is newly included.

The first to nth payload processing units 53 to 54 are selectively activated depending on header analysis by the header processing unit 13. These n payload processing units 53 to 54 are mutually exclusive, that is, as long as one payload processing unit is active, the other payload processing units stay idle.

The signal selecting unit 55 selectively outputs a processing result of one of the first to nth payload processing units 53 to 54 to the SDRAM 19, in accordance with the header analysis by the header processing unit 13.

Figure 20:
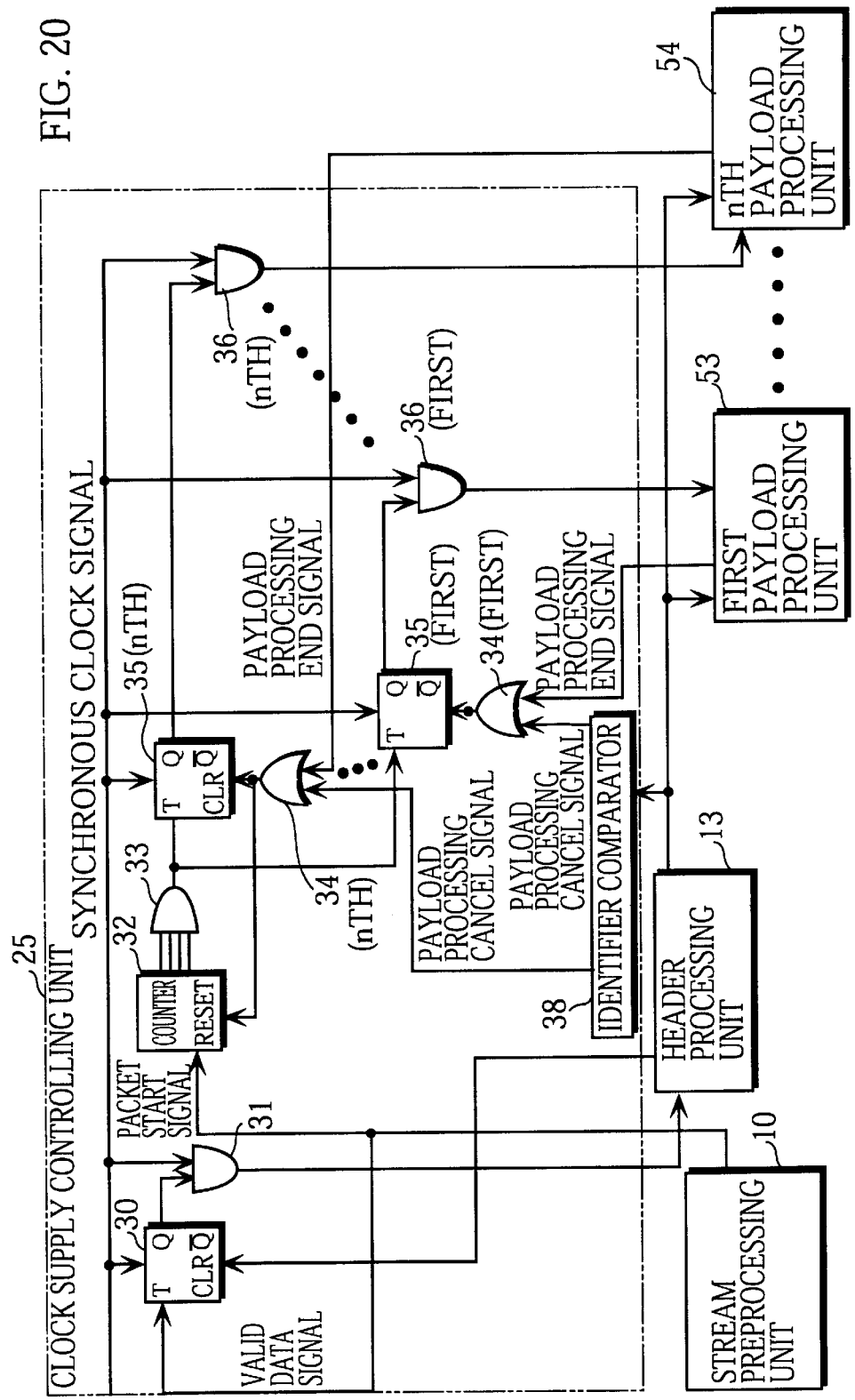
FIG. 20 shows the construction of a clock supply controlling unit 25 in FIG. 19.

FIG. 20 shows the construction of a clock supply controlling unit 25 in the stream demultiplexing device 26 shown in FIG. 19. In the figure, the OR gate 34, the T flip-flop 35, and the AND gate 36 in FIG. 8 are replaced with n OR gates 34, n T flip-flops 35, and n AND gates 36, and an identifier comparator 38 is newly included.

Of the n sets of OR gates, T flip-flops, and AND gates, the first OR gate 34, the first T flip-flop 35, and the first AND gate 36 serve to supply the synchronous clock signal to the first payload processing unit 53, and the nth OR gate 34, the nth T flip-flop 35, and the nth AND gate 36 serve to supply the synchronous clock signal to the nth payload processing unit 54.

The identifier comparator 38, on receiving a matched PID from the header processing unit 13 as the outcome of analyzing a header of a transport packet, judges which payload processing unit is to process a payload of the transport packet, and outputs the payload processing cancel signal of high level to OR gates 34 corresponding to payload processing units other than the payload processing unit which is judged to process the payload.

FIG. 21 shows how the synchronous clock signal is supplied to the first to nth payload processing units 53 to 54 in the stream demultiplexing device 26 of the fourth embodiment.

In the figure, the first row shows a transport stream, and the second row shows the synchronous clock signal supply to the header processing unit 13. The third row shows the output of the AND gate 33, the fourth row shows the state of the payload processing cancel signal or the payload processing end signal outputted to the first OR gate 34, the fifth row shows the Q output of the first T flip-flop 35, and the sixth row shows the synchronous clock signal supply to the first payload processing unit 53. The seventh row shows the state of the payload processing cancel signal or the payload processing end signal outputted to the nth OR gate 34, the eighth row shows the Q output of the nth T flip-flop 35, and the ninth row shows the synchronous clock signal supply to the nth payload processing unit 54.

When the identifier comparator 38 judges that payload 1 of transport packet 1 is to be processed by the first payload processing unit 53 based on a matched PID outputted from the header processing unit 13, the identifier comparator 38 outputs the payload processing cancel signal of high level to the nth OR gate 34 at the header processing end time 803, as shown by the rising edge y11. As a result, the Q output of the nth T flip-flop 35 is held low, thereby preventing the nth AND gate 36 from supplying the synchronous clock signal to the nth payload processing unit 54 from the header processing end time 803 onward, as shown by the arrow y13.

Following this, when the identifier comparator 38 judges that payload 2 of transport packet 2 is to be processed by the nth payload processing unit 54 based on a matched PID outputted from the header processing unit 13, the identifier comparator 38 outputs the payload processing cancel signal of high level to the first OR gate 34 at the header processing end time 813, as shown by the rising edge y14. As a result, the Q output of the first T flip-flop 35 is driven low, thereby preventing the first AND gate 36 from supplying the synchronous clock signal to the first payload processing unit 53 from the header processing end time 813 onward, as shown by the arrow y16.

According to this embodiment, even if the stream demultiplexing device 26 has large circuitry due to the inclusion of n payload processing units, only a payload processing unit which is to process a transport packet transferred from the header processing unit 13 is provided with the synchronous clock signal, so that power consumption for the n payload processing units is limited to 1/n.

Though the present invention has been described based on the above embodiments, the invention is not limited to such. For example, the following modifications are possible.

(a) Though the clock supply controlling unit 25 has supplied the synchronous clock signal to the payload processing unit 16 as a single unit in the above embodiments, the synchronous clock signal may be supplied separately to the formatting unit 17 and the filtering unit 18. In such a case, the synchronous clock signal is supplied to the formatting unit 17 while a payload is being inputted and processed in the formatting unit 17, and is supplied to the filtering unit 18 while the payload is being inputted and processed in the filtering unit 18.

(b) Though the clock supply controlling unit 25 has detected the header input start time based on the packet start signal and the valid data signal in the above embodiments, the header input start time may be detected by the stream preprocessing unit 10 referring to a sync byte present at the start of a transport packet header.

(c) Though the clock supply controlling unit 25 has controlled the synchronous clock signal supply to both the header processing unit 13 and the payload processing unit 16 in the above embodiments, instead the clock supply controlling unit 25 may control the synchronous clock signal supply to only one of them.

(d) In the third embodiment, the clock supply controlling unit 25 may control only the synchronous clock signal supply to the decrypting unit 51. Given that power consumption of the decrypting unit 51 is much larger than that of the header processing unit 13 or the payload processing unit 16, a substantial effect can be obtained even when the control of the synchronous clock signal supply is limited to the decrypting unit 51.

(e) Though the stream preprocessing unit 10, the header processing unit 13, and the payload processing unit 16 have been connected in this order so that a transport packet is transferred through this route, the header processing unit 13 and the payload processing unit 16 may each be directly connected to the stream preprocessing unit 10.

In this case, the input of the payload in the payload processing unit 16 starts not at the header processing end time 803 but at the header input end time 802 shown in FIG. 10, as a result of which the start of the payload input and the completion of the payload processing in the payload processing unit 16 become earlier.

(f) In the third embodiment, the stream preprocessing unit 10, the header processing unit 13, the decrypting unit 51, and the payload processing unit 16 have been connected in this order so that a transport packet is transferred through this route. Alternatively, the decrypting unit 51 may be directly connected to the stream preprocessing unit 10.

In this case, the input of the payload in the decrypting unit 51 starts not at the header processing end time 803 but at the header input end time 802 shown in FIG. 16. As a result, the start of the payload input and the completion of the payload processing in the payload processing unit 16 become earlier.

(g) In the fourth embodiment, the stream preprocessing unit 10, the header processing unit 13, and the first to nth payload processing units 53 to 54 have been connected in this order so that a transport packet is transferred through this route. Instead, the first to nth payload processing units 53 to 54 may each be connected directly to the stream preprocessing unit 10.

In this case, the input of the payload in the active payload processing unit starts not at the header processing end time 803 but at the header input end time 802 in FIG. 21. As a result, the start of the payload input and the completion of the payload processing in the active payload processing unit become earlier.

(h) The periods presented in FIGS. 5 and 16 are merely examples and should not be limited as such, although it is necessary to adjust the threshold value in the counter 32 in the clock supply controlling unit 25 whenever these periods change.

(i) In the above embodiments, the header processing end time has been monitored by the counter 32. Alternatively, the header processing end time may be detected by feeding the header processing end signal from the header processing unit 13 to the T input of the T flip-flop 35, though the use of the counter 32 is more effective in the case where the header processing end time and the payload input start time differ.

(j) Though a transport stream made up of a plurality of transport packets has been subjected to demultiplexing in the above embodiments, the invention may also be applied to a system decoder for demultiplexing a system stream recorded on an optical disk such as a DVD-ROM or a DVD-RAM. Such a system stream is made up of a plurality of packs each of which has a header and a payload, with data taken from a video, audio, or private stream being stored in the payload. If synchronous clock signal supply to the header processing unit 13 and the payload processing unit 16 in such a system decoder is controlled by the clock supply controlling unit 25, power consumption in the system decoder can be reduced.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A stream demultiplexing device for demultiplexing a plurality of elementary streams from a transport stream in which the plurality of elementary streams are time-division multiplexed, the transport stream including a plurality of transport packets that each contain a payload carrying a data portion taken from one of the plurality of elementary streams, the stream demultiplexing device comprising:

a storing unit having a plurality of storage areas each for storing a different one of the plurality of elementary streams;

a signal generating unit for generating a synchronous clock signal;

a payload processing unit for obtaining, after the stream demultiplexing device starts receiving a present transport packet, a payload of the present transport packet and transferring a data portion in the obtained payload to a storage area in the storing unit that corresponds to an elementary stream from which the data portion was taken, in accordance with the synchronous clock signal supplied from the signal generating unit; and a first clock supply controlling unit for stopping the supply of the synchronous clock signal to the payload processing unit when the payload processing unit finishes transferring the data portion, and resuming the supply a predetermined time period after the stream demultiplexing device starts receiving a transport packet that follows the present transport packet.

2. The stream demultiplexing device of claim 1, wherein the payload of each transport packet in the transport stream further carries an identifier identifying the elementary stream from which the data portion in the payload was taken, wherein the payload processing unit includes:

a formatting unit for extracting the data portion from the payload of the present transport packet, after the stream demultiplexing device starts receiving the present transport packet; and a filtering unit holding a plurality of identifiers in advance, for transferring the extracted data portion to the storing unit if an identifier in the payload of the present transport packet matches any of the plurality of identifiers, and rejecting the data portion if the identifier in the payload does not match any of the plurality of identifiers, wherein the first clock supply controlling unit includes a stopping unit for stopping the supply of the synchronous clock signal to the payload processing unit when the filtering unit rejects the data portion, and wherein the first clock supply controlling unit resumes the supply which was stopped by the stopping unit, the predetermined time period after the stream demultiplexing device starts receiving the following transport packet.

3. The stream demultiplexing device of claim 1,
wherein the plurality of elementary streams include a video stream generated by encoding a video signal and an audio stream generated by encoding an audio signal, and
wherein after the video stream and the audio stream have been reconstructed in the storing unit from the data portions transferred by the payload processing unit, the video stream and the audio stream are decoded using a dedicated decoder outside the stream demultiplexing device.

4. The stream demultiplexing device of claim 1,
wherein each transport packet in the transport stream further contains a header carrying an identifier identifying the elementary stream from which the data portion in the payload was taken,
the stream demultiplexing device further comprising:
  a header processing unit for obtaining, when the stream demultiplexing device starts receiving the present transport packet, a header of the present transport packet and analyzing the obtained header to determine the elementary stream from which the data portion in the payload of the present transport packet was taken, in accordance with the synchronous clock signal supplied from the signal generating unit; and
  a second clock supply controlling unit for stopping the supply of the synchronous clock signal to the header processing unit when the header processing unit finishes analyzing the header, and resuming the supply when the stream demultiplexing device starts receiving the following transport packet,
  wherein the payload processing unit transfers, based on the analysis by the header processing unit, the data portion in the payload of the present transport packet to the corresponding storage area in the storing unit.

5. The stream demultiplexing device of claim 4,
wherein the payload processing unit includes
  a plurality of processing subunits each for processing a payload in accordance with the synchronous clock signal supplied from the signal generating unit,
wherein the header processing unit includes
  a selecting unit for selecting one of the plurality of processing subunits which is to process the payload of the present transport packet, based on an identifier in the header of the present transport packet, and
  wherein the first clock supply controlling unit stops the supply of the synchronous clock signal to the other processing subunits when the selecting unit selects the processing subunit, and resumes the supply when the selected processing subunit finishes transferring the data portion and the stream demultiplexing device starts receiving the following transport packet.

6. The stream demultiplexing device of claim 4,
wherein the header processing unit includes:
  a reading unit for reading an identifier from the header of the present transport packet;
  a holding unit for holding a predetermined tuning identifier in advance; and
  a judging unit for judging whether the identifier read by the reading unit matches the tuning identifier held in the holding unit, and notifying the read identifier to the payload processing unit if the read identifier matches the tuning identifier,
wherein the first clock supply controlling unit includes
  a stopping unit for stopping the supply of the synchronous clock signal to the payload processing unit when the judging unit in the header processing unit judges that the read identifier does not match the tuning identifier, and
  wherein the first clock supply controlling unit resumes the supply which was stopped by the stopping unit, the predetermined time period after the stream demultiplexing device starts receiving the following transport packet.

7. The stream demultiplexing device of claim 4,
wherein the payload of each transport packet in the transport stream further carries an identifier identifying the elementary stream from which the data portion in the payload was taken,
wherein the payload processing unit includes:
  a formatting unit for extracting the data portion from the payload of the present transport packet, after the stream demultiplexing device starts receiving the present transport packet; and
  a filtering unit holding a plurality of identifiers in advance, for transferring the extracted data portion to the storing unit if an identifier in the payload of the present transport packet matches any of the plurality of identifiers, and rejecting the data portion if the identifier in the payload does not match any of the plurality of identifiers,
wherein the first clock supply controlling unit includes
  a stopping unit for stopping the supply of the synchronous clock signal to the payload processing unit when the filtering unit rejects the data portion, and
  wherein the first clock supply controlling unit resumes the supply which was stopped by the stopping unit, the predetermined time period after the stream demultiplexing device starts receiving the following transport packet.

8. The stream demultiplexing device of claim 7,
wherein the header processing unit corresponds to a stage preceding the payload processing unit,
wherein the predetermined time period is a period taken for the header processing unit to obtain and analyze a header, and
wherein the first clock supply controlling unit has a counter that starts counting in accordance with the synchronous clock signal when the stream demultiplexing device starts receiving each transport packet in the transport stream, in order to monitor a lapse of the predetermined time period.

9. The stream demultiplexing device of claim 4,
wherein stuffing data is present after each transport packet in the transport stream,
wherein the second clock supply controlling unit stops the supply of the synchronous clock signal to the header processing unit when the header processing unit finishes analyzing the header of the present transport packet, prohibits the supply while the stream demultiplexing device is receiving the payload of the present transport packet and stuffing data following the present transport packet, and resumes the supply when the stream demultiplexing device starts receiving the following transport packet, and
wherein the first clock supply controlling unit stops the supply of the synchronous clock signal to the payload processing unit when the payload processing unit finishes transferring the data portion of the present transport packet, prohibits the supply while the stream demultiplexing device is receiving the stuffing data following the present transport packet, and resumes the supply the predetermined time period after the stream demultiplexing device starts receiving the following transport packet.

10. The stream demultiplexing device of claim 9, wherein a parity code is present after each transport packet in the transport stream, wherein the stream demultiplexing device is connected to an error correcting device that (1) performs error correction on the transport stream using the parity code and (2) outputs to the stream demultiplexing device the corrected transport stream in which the stuffing data is present after each transport packet in place of the parity code, and wherein the header processing unit and the payload processing unit respectively obtain the header and the payload of the present transport packet included in the corrected transport stream.

11. The stream demultiplexing device of claim 10, wherein the error correcting device also outputs a packet start signal and a valid data signal to the stream demultiplexing device, the packet start signal showing a start of each transport packet in the corrected transport stream, and the valid data signal being active while each transport packet is being received by the stream demultiplexing device, and being inactive while the stuffing data after each transport packet is being received by the stream demultiplexing device, the stream demultiplexing device further comprising a stream preprocessing unit for storing part of the corrected transport stream received by the stream demultiplexing device while the valid data signal is active, into a buffer as the present transport packet, wherein the first clock supply controlling unit and the second clock supply controlling unit specify, based on the packet start signal and the valid data signal, a time at which the stream demultiplexing device starts receiving the present transport packet, a time at which the second clock supply controlling unit resumes the supply of the synchronous clock signal to the header processing unit, and a time at which the first clock supply controlling unit resumes the supply of the synchronous clock signal to the payload processing unit, and control the supply of the synchronous clock signal to the header processing unit and the payload processing unit based on the specified times.

12. The stream demultiplexing device of claim 4, wherein at least one of the plurality of elementary streams has been encrypted before being multiplexed in the transport stream, wherein the header processing unit includes:

a reading unit for reading an identifier from the header of the present transport packet;

a holding unit for prestoring an identifier identifying the encrypted elementary stream; and a judging unit for judging whether the identifier read by the reading unit matches the identifier in the holding unit, the stream demultiplexing device further comprising:

a decrypting unit for obtaining, if the judging unit in the header processing unit judges that the read identifier matches the identifier in the holding unit, the payload of the present transport packet and decrypting the data portion in the obtained payload, in accordance with the synchronous clock signal supplied from the signal generating unit; and a third clock supply controlling unit for stopping the supply of the synchronous clock signal to the decrypting unit when the decrypting unit finishes decrypting the data portion, and resuming the supply when the judging unit judges that an identifier in a header of the following transport packet matches the identifier in the holding unit, wherein if the judging unit judges that the read identifier matches the identifier in the holding unit, the payload processing unit obtains the decrypted data portion generated by the decrypting unit and transfers the decrypted data portion to the storing unit, in accordance with the synchronous clock signal.

13. The stream demultiplexing device of claim 12, wherein the decrypting unit corresponds to a stage preceding the payload processing unit and succeeding the header processing unit, wherein the predetermined time period is a total period taken for the header processing unit to obtain and analyze a header and the decrypting unit to obtain a payload and decrypt a data portion therein, and wherein the first clock supply controlling unit has a counter that starts counting in accordance with the synchronous clock signal when the stream demultiplexing device starts receiving each transport packet in the transport stream, in order to monitor a lapse of the predetermined time period.

14. The stream demultiplexing device of claim 13, wherein stuffing data is present after each transport packet in the transport stream, wherein the second clock supply controlling unit stops the supply of the synchronous clock signal to the header processing unit when the header processing unit finishes analyzing the header of the present transport packet, prohibits the supply while the stream demultiplexing device is receiving the payload of the present transport packet and stuffing data following the present transport packet, and resumes the supply when the stream demultiplexing device starts receiving the following transport packet, and wherein the first clock supply controlling unit stops the supply of the synchronous clock signal to the payload processing unit when the payload processing unit finishes transferring the data portion of the present transport packet, prohibits the supply while the stream demultiplexing device is receiving the stuffing data following the present transport packet, and resumes the supply the predetermined time period after the stream demultiplexing device starts receiving the following transport packet.

15. The stream demultiplexing device of claim 14, wherein a parity code is present after each transport packet in the transport stream, wherein the stream demultiplexing device is connected to an error correcting device that (1) performs error correction on the transport stream using the parity code and (2) outputs to the stream demultiplexing device the corrected transport stream in which the stuffing data is present after each transport packet in place of the parity code, and wherein the header processing unit and the payload processing unit respectively obtain the header and the payload of the present transport packet included in the corrected transport stream.

16. The stream demultiplexing device of claim 15, wherein the error correcting device also outputs a packet start signal and a valid data signal to the stream demultiplexing device, the packet start signal showing a start of each transport packet in the corrected transport stream, and the valid data signal being active while each transport packet is being received by the stream demultiplexing device, and being inactive while the stuffing data after each transport packet is being received by the stream demultiplexing device, the stream demultiplexing device further comprising
a stream preprocessing unit for storing part of the corrected transport stream received by the stream demultiplexing device while the valid data signal is active, into a buffer as the present transport packet,
wherein the first clock supply controlling unit and the second clock supply controlling unit specify, based on the packet start signal and the valid data signal, a time at which the stream demultiplexing device starts receiving the present transport packet, a time at which the second clock supply controlling unit resumes the supply of the synchronous clock signal to the header processing unit, and a time at which the first clock supply controlling unit resumes the supply of the synchronous clock signal to the payload processing unit, and control the supply of the synchronous clock signal to the header processing unit and the payload processing unit based on the specified times.

17. A stream demultiplexing device for demultiplexing a plurality of elementary streams from a transport stream in which the plurality of elementary streams are time-division multiplexed, the transport stream including a plurality of transport packets that each contain: a payload carrying a data portion taken from one of the plurality of elementary streams; and a header carrying an identifier identifying the elementary stream from which the data portion was taken, the stream demultiplexing device comprising:
a storing unit having a plurality of storage areas each for storing a different one of the plurality of elementary streams;
a signal generating unit for generating a synchronous clock signal;
a header processing unit for obtaining, when the stream demultiplexing device starts receiving a present transport packet, a header of the present transport packet and analyzing the obtained header to determine an elementary stream from which a data portion in a payload of the present transport packet was taken, in accordance with the synchronous clock signal supplied from the signal generating unit;
a payload processing unit for obtaining, after the stream demultiplexing device starts receiving the present transport packet, the payload of the present transport packet and transferring the data portion in the obtained payload to a storage area in the storing unit that corresponds to the elementary stream determined by the header processing unit, in accordance with the synchronous clock signal supplied from the signal generating unit;
a first clock supply controlling unit for stopping the supply of the synchronous clock signal to the payload processing unit when the payload processing unit finishes transferring the data portion, and resuming the supply a predetermined time period after the stream demultiplexing device starts receiving a transport packet that follows the present transport packet; and
a second clock supply controlling unit for stopping the supply of the synchronous clock signal to the header processing unit when the header processing unit finishes analyzing the header, and resuming the supply when the stream demultiplexing device starts receiving the following transport packet.

18. The stream demultiplexing device of claim 17,
wherein the header processing unit includes:
a reading unit for reading an identifier from the header of the present transport packet;
a holding unit for holding a predetermined tuning identifier in advance; and
a judging unit for judging whether the identifier read by the reading unit matches the tuning identifier held in the holding unit, and notifying the read identifier to the payload processing unit if the read identifier matches the tuning identifier,
wherein the first clock supply controlling unit includes
a stopping unit for stopping the supply of the synchronous clock signal to the payload processing unit when the judging unit in the header processing unit judges that the read identifier does not match the tuning identifier, and
wherein the first clock supply controlling unit resumes the supply which was stopped by the stopping unit, the predetermined time period after the stream demultiplexing device starts receiving the following transport packet.

19. The stream demultiplexing device of claim 17,
wherein the payload of each transport packet in the transport stream further carries an identifier identifying the elementary stream from which the data portion in the payload was taken,
wherein the payload processing unit includes:
a formatting unit for extracting the data portion from the payload of the present transport packet, after the stream demultiplexing device starts receiving the present transport packet; and
a filtering unit holding a plurality of identifiers in advance, for transferring the extracted data portion to the storing unit if an identifier in the payload of the present transport packet matches any of the plurality of identifiers, and rejecting the data portion if the identifier in the payload does not match any of the plurality of identifiers,
wherein the first clock supply controlling unit includes
a stopping unit for stopping the supply of the synchronous clock signal to the payload processing unit when the filtering unit rejects the data portion, and
wherein the first clock supply controlling unit resumes the supply which was stopped by the stopping unit, the predetermined time period after the stream demultiplexing device starts receiving the following transport packet.

20. The stream demultiplexing device of claim 19,
wherein the header processing unit corresponds to a stage preceding the payload processing unit,
wherein the predetermined time period is a period taken for the header processing unit to obtain and analyze a header, and
wherein the first clock supply controlling unit has a counter that starts counting in accordance with the synchronous clock signal when the stream demultiplexing device starts receiving each transport packet in the transport stream, in order to monitor a lapse of the predetermined time period.

21. A stream demultiplexing device for demultiplexing a plurality of elementary streams from a transport stream in which the plurality of elementary streams are time-division multiplexed, the transport stream including a plurality of transport packets that each contain: a payload carrying a data portion taken from one of the plurality of elementary streams; and a header carrying an identifier identifying the elementary stream from which the data portion was taken, wherein at least one of the plurality of elementary streams has been encrypted before being multiplexed in the transport stream, the stream demultiplexing device comprising:

a storing unit having a plurality of storage areas each for storing a different one of the plurality of elementary streams;

a signal generating unit for generating a synchronous clock signal;

a header processing unit for obtaining, when the stream demultiplexing device starts receiving a present transport packet, a header of the present transport packet and analyzing the obtained header to determine an elementary stream from which a data portion in a payload of the present transport packet was taken; and a payload processing unit for obtaining, after the stream demultiplexing device starts receiving the present transport packet, the payload of the present transport packet and transferring the data portion in the obtained payload to a storage area in the storing unit that corresponds to the elementary stream determined by the header processing unit, wherein the header processing unit includes:

a reading unit for reading an identifier from the header of the present transport packet;

a holding unit for prestoring an identifier identifying the encrypted elementary stream; and a judging unit for judging whether the identifier read by the reading unit matches the identifier in the holding unit, the stream demultiplexing device further comprising:

a decrypting unit for obtaining, if the judging unit in the header processing unit judges that the read identifier matches the identifier in the holding unit, the payload of the present transport packet and decrypting the data portion in the obtained payload, in accordance with the synchronous clock signal supplied from the signal generating unit; and a clock supply controlling unit for stopping the supply of the synchronous clock signal to the decrypting unit when the decrypting unit finishes decrypting the data portion, and resuming the supply when the judging unit judges that an identifier in a header of a transport packet that follows the present transport packet matches the identifier in the holding unit, wherein if the judging unit judges that the read identifier matches the identifier in the holding unit, the payload processing unit obtains the decrypted data portion generated by the decrypting unit and transfers the decrypted data portion to the storing unit.

22. A stream demultiplexing device for demultiplexing a plurality of elementary streams from a transport stream in which the plurality of elementary streams are time-division multiplexed, the transport stream including a plurality of transport packets that each contain: a payload carrying a data portion taken from one of the plurality of elementary streams; and a header carrying an identifier identifying the elementary stream from which the data portion was taken, the stream demultiplexing device comprising:

a storing unit having a plurality of storage areas each for storing a different one of the plurality of elementary streams;

a signal generating unit for generating a synchronous clock signal;

a payload processing unit for obtaining, after the stream demultiplexing device starts receiving a present transport packet, a payload of the present transport packet and transferring a data portion in the obtained payload to a storage area in the storing unit that corresponds to an elementary stream from which the data portion was taken, wherein the payload processing unit includes a plurality of processing subunits each for processing a payload in accordance with the synchronous clock signal supplied from the signal generating unit, the stream demultiplexing device further comprising:

a header processing unit for selecting one of the plurality of processing subunits which is to process the payload of the present transport packet, based on an identifier in a header of the present transport packet; and a clock supply controlling unit for stopping the supply of the synchronous clock signal to the other processing subunits when the header processing unit selects the processing subunit, and resuming the supply when the selected processing subunit finishes transferring the data portion of the present transport packet and the stream demultiplexing device starts receiving a transport packet that follows the present transport packet.

* * * * *